(12) United States Patent
Ninomiya et al.

(10) Patent No.: US 7,304,610 B2
(45) Date of Patent: Dec. 4, 2007

(54) POSITIONING OF MOBILE WIRELESS TERMINAL

(75) Inventors: Teruhisa Ninomiya, Kawasaki (JP); Isamu Yamada, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 11/582,377

(22) Filed: Oct. 18, 2006

(65) Prior Publication Data

US 2007/0037518 A1 Feb. 15, 2007

Related U.S. Application Data

(62) Division of application No. 10/353,002, filed on Jan. 29, 2003, now Pat. No. 7,158,078.

(30) Foreign Application Priority Data

Apr. 18, 2002 (JP) ............................. 2002-116808

(51) Int. Cl.
*G01S 5/04* (2006.01)
(52) U.S. Cl. .................... 342/457; 342/442; 342/463; 342/464; 342/465
(58) Field of Classification Search ............... 342/442, 342/457, 463–465
See application file for complete search history.

(56) References Cited

U.S. PATENT DOCUMENTS

| 3,866,229 A | 2/1975 | Hammack |
| 6,288,676 B1 * | 9/2001 | Maloney ..................... 342/457 |
| 6,608,592 B2 * | 8/2003 | McReynolds ............... 342/464 |
| 2004/0203380 A1 | 10/2004 | Hamdi et al. |

FOREIGN PATENT DOCUMENTS

| JP | 63-140911 | 6/1988 |
| JP | 64-016979 | 1/1989 |
| JP | 2-7516 | 1/1990 |
| JP | 5-188128 | 7/1993 |
| JP | 6-222124 | 9/1994 |
| JP | 6-241817 | 9/1994 |
| JP | 7-280909 | 10/1995 |
| JP | 8-86864 | 4/1996 |
| JP | 9-502017 | 2/1997 |
| JP | 9-161177 | 6/1997 |

(Continued)

OTHER PUBLICATIONS

R.L. Moses, A Self-Localization Method for Wireless Sensor Networks, EURASIP Journal on Applied Signal Processing, p. 348-358, 2003.

(Continued)

*Primary Examiner*—Thomas H. Tarcza
*Assistant Examiner*—Fred H. Mull
(74) *Attorney, Agent, or Firm*—Staas & Halsey LLP

(57) ABSTRACT

An apparatus for determining a position of a mobile wireless station comprises means for determining the position of the mobile wireless station in accordance with a position of a first reference wireless station, a position of a second reference wireless station, a first relative angular direction between the mobile wireless station and the first reference wireless station, and a second relative angular direction between the mobile wireless station and the second reference wireless station.

17 Claims, 16 Drawing Sheets

FOREIGN PATENT DOCUMENTS

JP        9-269365      10/1997
JP        11-128433     5/1999

OTHER PUBLICATIONS

S. Roy et al., Neighborhood Tracking and Location Estimation of Nodes in Ad hoc Networks Using Directional Antenna: A Testbed Implementation, WirelessCom 2005, Jun. 2005.

E. Abbott et al., Land-vehicle navigation using GPS, Proceedings of the IEEE, vol. 87(1), p. 145-162, Jan. 1999.

D. Niculescu, Localized positioning in ad hoc networks, Proceedings of the First IEEE International Workshop on Sensor Network Protocols and Applications, p. 42-50, May 2003.

S. Capkun et al., GPS-free positioning in mobile and-hoc networks, Proceedings of the 34th Annual Hawaii International Conference on System Sciences, Jan. 2001.

Office Action (Notice of Reason of Refusal) for corresponding Japanese application.

Second Final Office Action with English translation, transmitted on Apr. 3, 2007 from the Japan Patent Office, corresponding to Japanese Application 2002-116808.

* cited by examiner

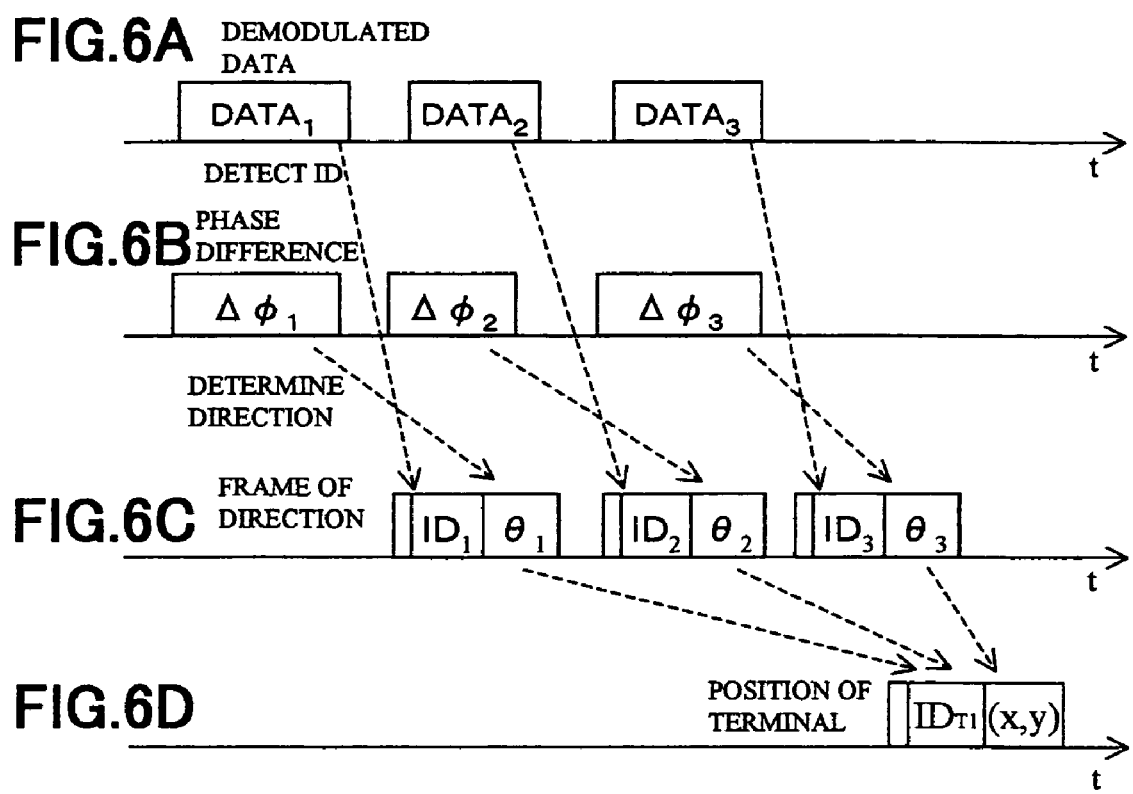

SIGNAL A IS ADVANCED
FROM SIGNAL B

SIGNAL A IS DELAYED
FROM SIGNAL B

POSITIONING OF MOBILE WIRELESS TERMINAL

CROSS-REFERENCE TO RELATED APPLICATIONS

This application is a divisional application of application Ser. No. 10/353,002, filed Jan. 29, 2003 which is now U.S. Pat. No. 7,158,078. This application claims the benefit of Japanese Patent Application No. 2002-116808, filed Apr. 18, 2002 in the Japanese Patent Office, the disclosure of which is incorporated herein by reference.

BACKGROUND OF THE INVENTION

1. Field of the Invention

The present invention relates to positioning of a mobile wireless terminal, and more particularly to determination of the position of a mobile wireless terminal carried by a visitor in a place or facilities in which the visitor moves about, such as a museum or an amusement park.

2. Description of the Related Art

It is known that the position of a mobile telephone is determined by an access point and the determined position is sent to the telephone. In a method used in a mobile telephone system and a PHS (Personal Handyphone System), the position of a telephone is determined based on the position of an access point which is closest to the telephone. The accuracy or resolution of the positioning is about 100 to 200 m (meters) in the PHS, and is about 800 m or more in the mobile telephone.

In another method used in the PHS, the position of a mobile telephone is determined by a plurality of access points in accordance with respective levels of RF signals received from the telephone. The positioning accuracy is about 40 to 70 m.

It is known that the position of a mobile wireless terminal is determined by the triangulation method based on the propagation times of RF signals from a plurality of access points to the terminal. The positioning accuracy is about 10 to 20 m.

The methods for determining a position in accordance with the levels or propagation times of an RF signal may be effective in a small area where there is no obstacle. In general, however, the radio environment changes easily due to, for example, the influence of multi-paths caused by a building, a wall or the like. In the methods, therefore, detected values exhibit wide variations depending on a device or terminal, and hence the positioning accuracy is low.

A technique of determining the position of a mobile wireless terminal by using the GPS (Global Positioning System) is known. In a method using only the GPS, the positioning accuracy is about 30 to 100 m. In another method using the GPS together with an auxiliary system, a position of a mobile wireless terminal estimated by the GPS is corrected in accordance with information of the position which is measured by a reference station. The positioning accuracy is about 5 to 50 m. In these methods, the signal processing is complex, and the accuracy may be possibly lowered at an arbitrary time in accordance with the intention of the organization managing the GPS satellites. Inside a house or a valley between buildings, the positioning accuracy of the GPS is lowered.

PCT publication WO 95/04943 laid-open by Gernar on Feb. 16, 1995, which claims convention priority of U.S. patent Ser. No. 08/101,945 filed on Aug. 4, 1993, discloses a mono-pulse azimuth radar system for tracking an automotive vehicle. In the system, the position of a preceding vehicle is determined in accordance with the distance and angle of the preceding vehicle relative to the own vehicle. In the system, however, the position of a mobile terminal is not determined.

Japanese Patent Publication No. HEI 8-86864 (A) laid-open by Kago on Apr. 2, 1996 discloses an ETC (Electronic Toll Collection) system in which one lane is divided into four areas, received signals from four antennas of different directionalities are combined with one another to detect the presence or the absence of an incoming vehicle in each of the areas. In this system, in order to perform the detection at high accuracy in a larger range, many small areas and many antennas for the respective areas are required.

Japanese Patent Publication No. HEI 6-222124 (A) laid-open by Tamaoki et al. on Aug. 12, 1994 discloses a technique in which a directional antenna is used, and an actual intensity pattern of a received RF signal transmitted from a mobile unit is matched or compared with predetermined intensity patterns of received signals to determine the position of the mobile unit. The antenna has a relatively large size, and an apparatus of a large size is necessary for controlling the directionality of the antenna.

It is an object of the invention to determine more correctly the position of a mobile wireless terminal in a relatively narrow area.

It is another object of the invention to provide a configuration, which is simpler in structure and smaller in size, for determining the position of a mobile wireless terminal.

SUMMARY OF THE INVENTION

In accordance with one aspect of the invention, an apparatus for determining a position of a mobile wireless station comprises means for determining the position of the mobile wireless station in accordance with a position of a first reference wireless station, a position of a second reference wireless station, a first relative angular direction between the mobile wireless station and the first reference wireless station, and a second relative angular direction between the mobile wireless station and the second reference wireless station.

In accordance with another aspect of the invention, an apparatus for determining an angular direction of a wireless station comprises means for determining the angular direction of the wireless station relative to a reference angular direction, in accordance with a phase difference associated with a received RF signal.

In accordance with a further aspect of the invention, a wireless apparatus comprises first and second antennas displaced from each other by a predetermined distance for receiving an RF signal; and means for detecting a phase difference associated with the received RF signal between the first and second antennas.

In accordance with a still further aspect of the invention, a program (which may be stored on a storage medium) is for use in an information processing apparatus. The program is operable to effect the step of obtaining a first relative angular direction between a mobile wireless station and a first reference wireless station; the step of obtaining a second relative angular direction between the mobile wireless station and a second reference wireless station; and the step of determining a position of the mobile wireless station in accordance with a position of the first reference wireless station, a position of the second reference wireless station, the first relative angular direction, and the second relative angular direction.

In accordance with a still further aspect of the invention, a method for determining a position of a mobile wireless station comprises the step of obtaining a first relative angular direction between the mobile wireless station and a first reference wireless station; the step of obtaining a second relative angular direction between the mobile wireless station and a second reference wireless station; and the step of determining a position of the mobile wireless station in accordance with a position of the first reference wireless station, a position of the second reference wireless station, the first relative angular direction, and the second relative angular direction.

According to the invention, the position of a mobile wireless terminal in a relatively narrow area can be determined more correctly, and a configuration, which is simpler in structure and smaller in size, for determining the position of a mobile wireless terminal can be provided.

BRIEF DESCRIPTION OF THE DRAWINGS

FIGS. 6A to 6D show relationships among received data, phase differences, frames of angular direction data for determining the position, and the determined position data of the mobile wireless terminal;

DETAILED DESCRIPTION OF THE PREFERRED EMBODIMENTS

Figure 1:
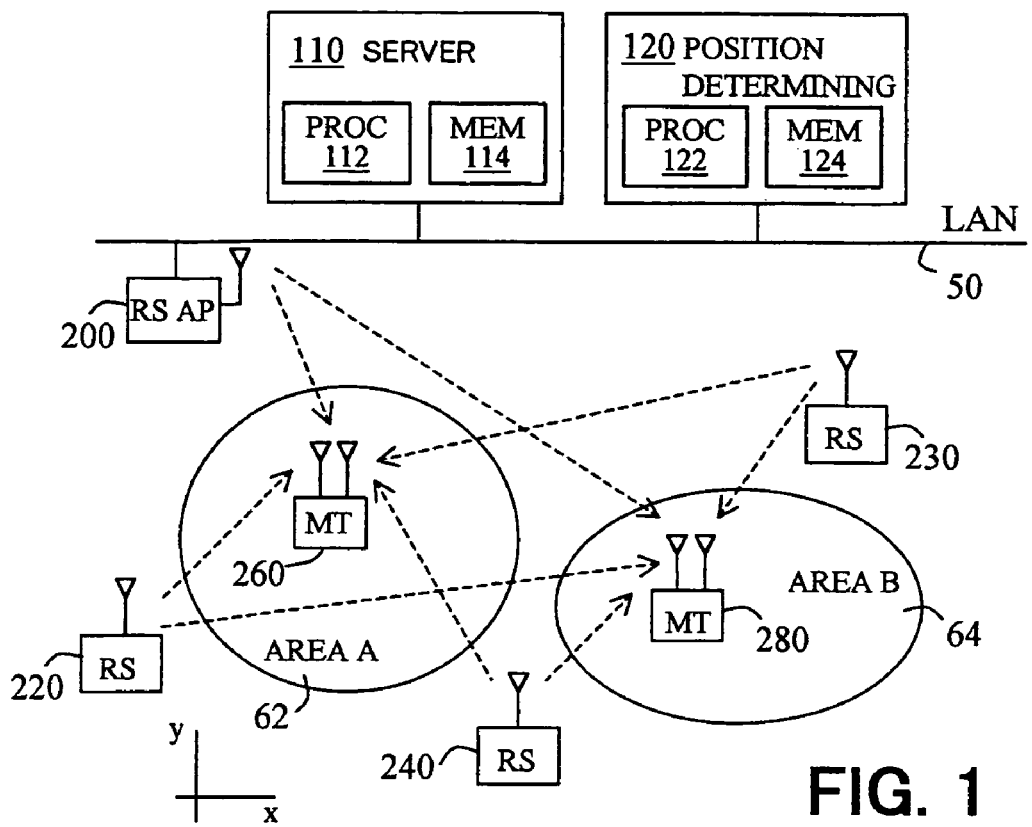
FIG. 1 shows a schematic configuration of a system for determining the positions of mobile wireless terminals in a plurality of indoor and/or outdoor areas or facilities, such as a museum or an amusement park, in accordance with the invention.

FIG. 1 shows a schematic configuration of a system for determining the positions of mobile wireless terminals or stations 260 and 280 carried by the visitors in a plurality of indoor and/or outdoor areas 62 and 64 and the like, in a place or facilities, such as a museum or an amusement park, where visitors move about, in accordance with the invention. A server 110 which provides information to mobile wireless terminals in the areas and collects information from the terminals, a position determining apparatus 120 which determines the position of a mobile wireless terminal in each area, and an access point 200 which is fixed in position are connected to one another via a wired local area network (LAN) 50. The access point 200 serves also as a reference wireless station which is used as a position reference. The server 110, the position determining apparatus 120, the access point 200 and the like may be geographically separated from one another, and connected to one another via a public switched telephone network (PSTN), leased lines or the like.

The server 110 has a processor 112 and a storage device 114. The processor 112 operates in accordance with an application program for the server function stored in the storage device 114. Alternatively, the server function may be implemented on the processor 112 in the form of hardware. The position determining apparatus 120 has a processor 122 and a storage device 124. The processor 122 operates in accordance with an application program for the position determining function stored in the storage device 124. Alternatively, the position determining function may be implemented on the processor 122 in the form of hardware. The position determining apparatus 120 may be eliminated, and the position determining function may be implemented by another apparatus, such as the server 110, the access point, or another reference wireless station or mobile wireless terminal as described later.

The visitors who carry the respective mobile wireless terminals 260 and 280 and the like enter the areas 62 and 64 which are indoor and/or outdoor, move in the areas, and then go out of the areas. Thus, the mobile wireless terminals 260 and 280 move around in indoor and/or outdoor areas including the areas 62 and 64. Each of the mobile wireless terminals 260 and 280 communicates with the server 110 via the access point 200 to receive suitable guidance information for the current position of the terminal from the server 110, and presents the information visually or audibly.

The access point 200, and reference wireless stations 220, 230 and 240 cover the areas 62 and 64. The reference wireless stations 220, 230 and 240 may communicate in the wireless form with the access point 200 to communicate with one another via the access point 200. Alternatively, the reference wireless stations 220, 230 and 240 may be connected via a cable to the LAN 50. It is assumed that, in the place or the facilities, the positions A ($x_1,y_1$), B ($x_2,y_2$), C ($x_3,y_3$) and D ($x_4,y_4$) of the reference wireless stations 200, 220, 230 and 240 are known. Preferably, the positions of the reference wireless stations 220, 230 and 240 are fixed. The reference wireless station may be moved to a different position, while the motion of the reference wireless station does not affect the positioning.

Each of the reference wireless stations 200, 220, 230 and 240 has at least one antenna for positioning. Each of the mobile wireless terminals 260 and 280 has at least two antennas for positioning. The reference wireless stations 200, 220, 230 and 240, and the mobile wireless terminals 260 and 280 serve as communication nodes. Each of the reference wireless stations 200, 220, 230 and 240 transmits an RF signal for determining the position (x,y) of each of the mobile wireless terminals 260 and 280. The position (x,y) of each of the mobile wireless terminals 260 and 280 is determined or detected in accordance with the RF signals received by the mobile wireless terminal as described later.

Figure 2:
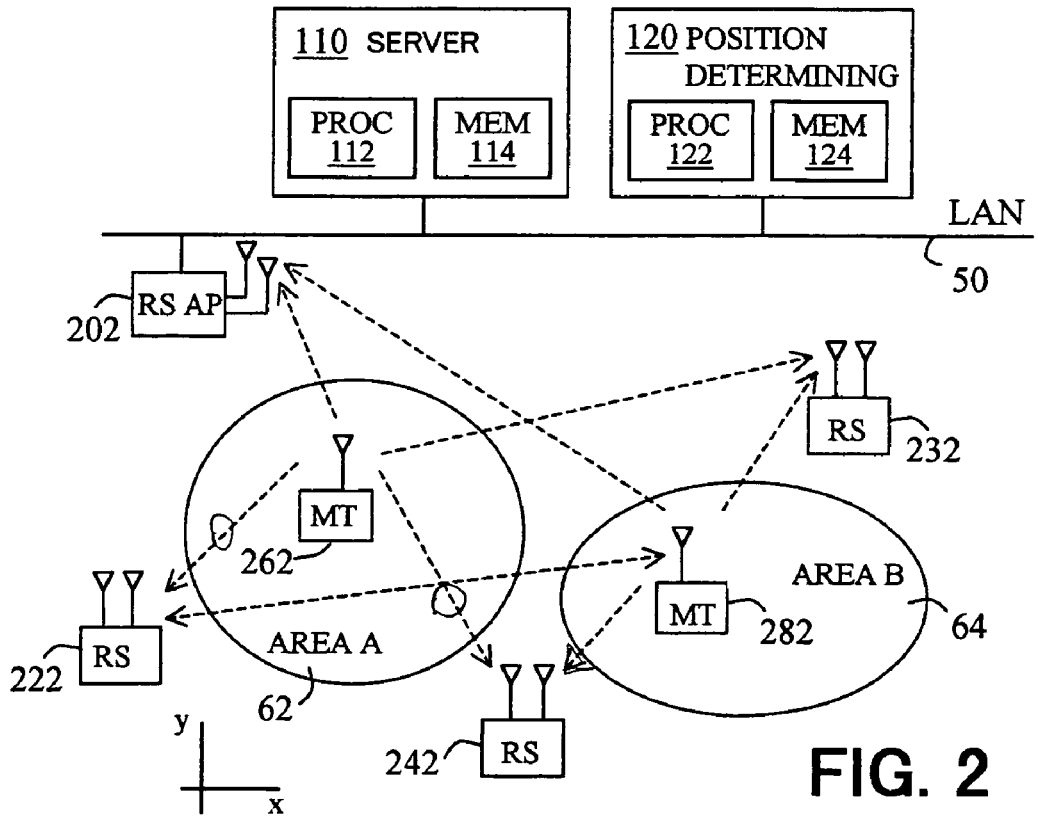
FIG. 2 shows a schematic configuration of another system for determining the positions of mobile wireless terminals in the plurality of indoor and/or outdoor areas, in accordance with the invention.

FIG. 2 shows a schematic configuration of another system for determining the positions of mobile wireless terminals 262 and 282 in the plurality of indoor and/or outdoor areas 62 and 64 and the like, which is a modification of the system of FIG. 1, in accordance with the invention. The server 110, the position determining apparatus 120, and an access point 202 which is fixed in position are connected to one another via the wired LAN 50. The access point 202 serves also as a reference wireless station.

The mobile wireless terminals 262 and 282 move around in indoor and/or outdoor areas including the areas 62 and 64. Each of the mobile wireless terminals 262 and 282 communicates with the server 110 via the access point 202 to receive suitable guidance information for the current position of the terminal from the server 110, and presents the information visually or audibly.

The access point 202, and reference wireless stations 222, 232 and 242 cover the areas 62 and 64. The reference wireless stations 222, 232 and 242 communicate in the wireless form with the access point 202 to communicate with one another via the access point 202. Alternatively, the reference wireless stations 222, 232 and 242 may be connected via a cable to the LAN 50. It is assumed that, in the place or the facilities, the positions A, B, C and D of the reference wireless stations 202, 222, 232 and 242 are known. Preferably, the positions of the reference wireless stations 222, 232 and 242 are fixed. The reference wireless station may be moved to a different position, while the motion of the reference wireless station does not affect the positioning.

Each of the reference wireless stations 202, 222, 232 and 242 has at least two antennas for positioning. Each of the mobile wireless terminals 262 and 282 has at least one antenna for positioning. The reference wireless stations 202, 222, 232 and 242, and the mobile wireless terminals 262 and 282 serve as communication nodes. Each of the mobile wireless terminals 262 and 282 transmits an RF signal for determining the position (x,y) of the terminal, to the reference wireless stations 202, 222, 232 and 242. The position (x,y) of the terminal is determined or detected in accordance with the RF signals received by the reference wireless stations 202, 222, 232 and 242, as described later.

Figure 3:
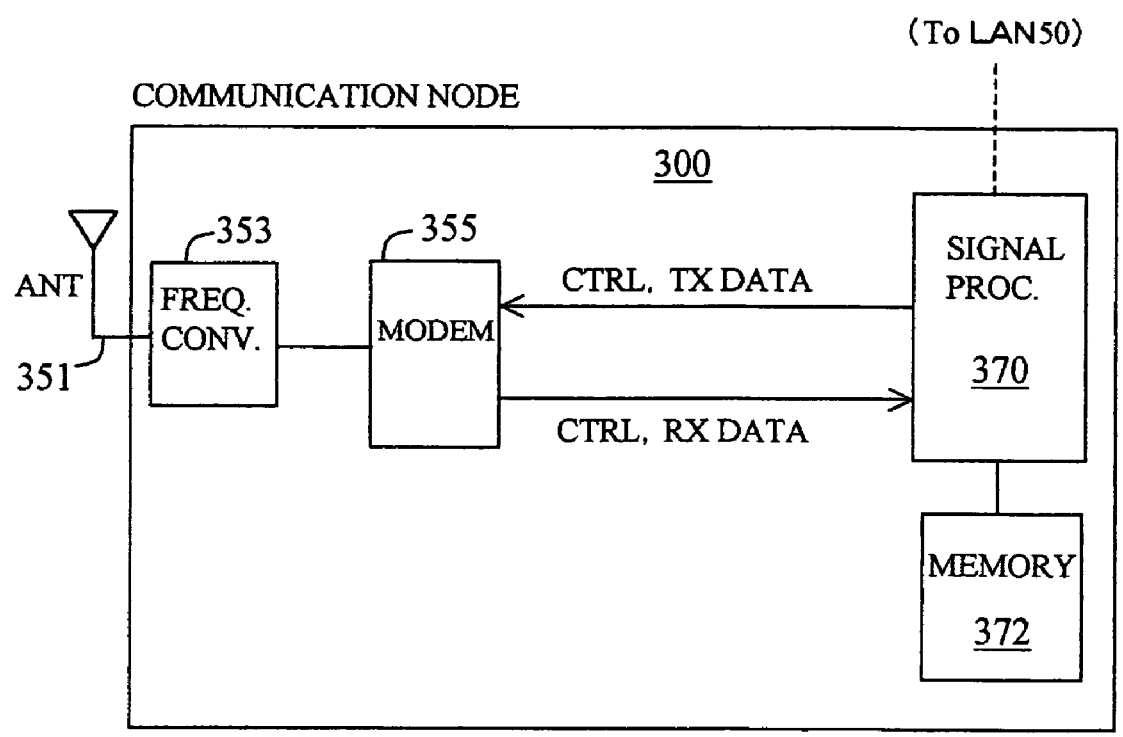
FIG. 3 shows a schematic configuration of a communication node representing the reference wireless stations of FIG. 1 having at least one antenna, and the mobile wireless terminals of FIG. 2 having at least one antenna.

FIG. 3 shows a schematic configuration of a communication node 300 representing the reference wireless stations 200, 220, 230 and 240 of FIG. 1 having at least one antenna, and the mobile wireless terminals 262 and 282 of FIG. 2 having at least one antenna. The node 300 has an antenna 351, a frequency converter 353 coupled to the antenna 351, a modem 355 coupled to the frequency converter 353, a signal processor 370 coupled to the modem 355, and a memory 372 including a ROM, a RAM and the like. The memory 372 stores programs and data for the processor 370.

The signal processor 370 of the access point 200 of FIG. 1 is connected to the LAN 50. The signal processors 370 of the reference wireless stations 220, 230 and 240 may communicate in the wireless form with the signal processor 370 of the access point 200 to communicate with one another via the access point 200. Alternatively, the signal processor 370 of each of the reference wireless stations 220, 230 and 240 may be connected via a cable to the LAN 50. The signal processor 370 of each of the mobile stations 262 and 282 of FIG. 2 communicates in the wireless form with the access point 202.

The signal processor 370 provides transmitted data and control signals for communication to the modem 355, and receives received data and control signals for communication from the modem. The control signals may be transmitted to or received from the server 110 or the position determining apparatus 120 via the signal processor 370. The transmitted data contains a source identifier (ID). A carrier signal modulated with the transmitted data by the modem 355 is upconverted by the frequency converter 353 and then transmitted as an RF signal via the antenna 351. On the other hand, an RF signal received by the antenna 351 is downconverted to an intermediate frequency (IF) signal by the frequency converter 353, which is then provided to the modem 355. The downconverted signal is demodulated by the modem 355 to produce received data and the received data is provided to the signal processor 370.

Figure 4:
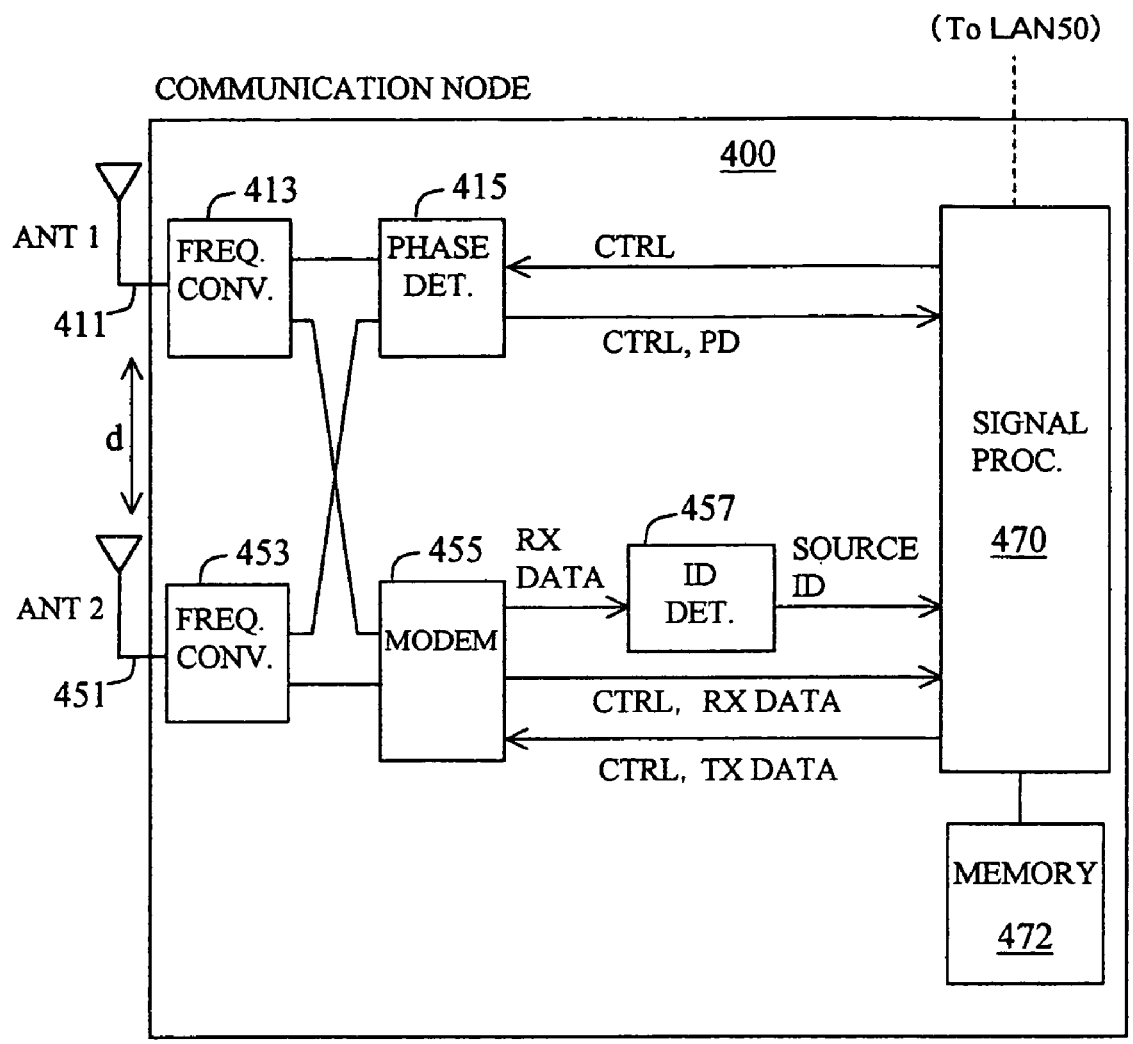
FIG. 4 shows a schematic configuration of a communication node representing the mobile wireless terminals of FIG. 1 having at least two antennas, and the reference wireless stations of FIG. 2 having at least two antennas.

FIG. 4 shows a schematic configuration of a communication node 400 representing the mobile wireless terminals 260 and 280 of FIG. 1 having at least two antennas, and the reference wireless stations 202, 222, 232 and 242 of FIG. 2 having at least two antennas. The node 400 has two antennas 411 and 451, frequency converters 413 and 453 coupled to the respective antennas 411 and 451, respectively, a phase difference detector 415 coupled to the frequency converters 413 and 453, a modem 455 coupled to the frequency converters 413 and 453, an ID detector 457 coupled to the modem 455, a signal processor 470, and a memory 472 including a ROM, a RAM and the like. The signal processor 470 is coupled to the phase difference detector 415, the modem 455 and the ID detector 457. The memory 472 stores programs and data for the processor 470. Alternatively, the ID detector 457 may be eliminated, and the ID detecting function of the ID detector 457 may be implemented on the processor 470.

The signal processor 470 of each of the mobile stations 260 and 280 of FIG. 1 communicates in the wireless form with the access point 200. The signal processors 470 of the reference wireless stations 222, 232 and 242 of FIG. 2 communicate in the wireless form with the signal processor 470 of the access point 202 to communicate with one another via the access point 202. Alternatively, the signal processor 470 of each of the reference wireless stations 222, 232 and 242 may be connected via a cable to the LAN 50.

For positioning, the node 400 of FIG. 4 receives the RF signal transmitted from the node 300 of FIG. 3, via the antennas 411 and 451. Each of the mobile wireless terminals 260 and 280 of FIG. 1 serving as the node 400 receives different transmitted RF signals from the reference wireless stations 220, 230 and 240 of FIG. 1 serving as the node 300. Each of the reference wireless stations 222, 232 and 242 of FIG. 2 serving as the node 400 receives different transmitted RF signals from the mobile wireless terminals 262 and 282 of FIG. 2 serving as the node 300.

Transmitted data, which is produced by the signal processor 470, is provided to the modem 455. A carrier signal modulated with the transmitted data by the modem 455 is upconverted by the frequency converter 413 or 453 and then transmitted as an RF signal to the node 300 via the antenna 411 or 451.

The RF signals from the node 300, which are received via the antennas 411 and 451, are downconverted to IF signals by the respective frequency converters 413 and 453. Both of the downconverted signals are provided to the phase difference detector 415. Alternatively, both of the received RF signals, which have not yet been downcoverted in the respective frequency converters 413 and 453, may be provided to the phase difference detector 415. One or both of the downconverted signals from the frequency converters 413 and 453 are provided also to the modem 455. When both of the signals are provided to the modem 455, received data on one of the signals are selected by the modem 455, or both the signals are combined with each other for demodulation in a good condition.

Figure 5:
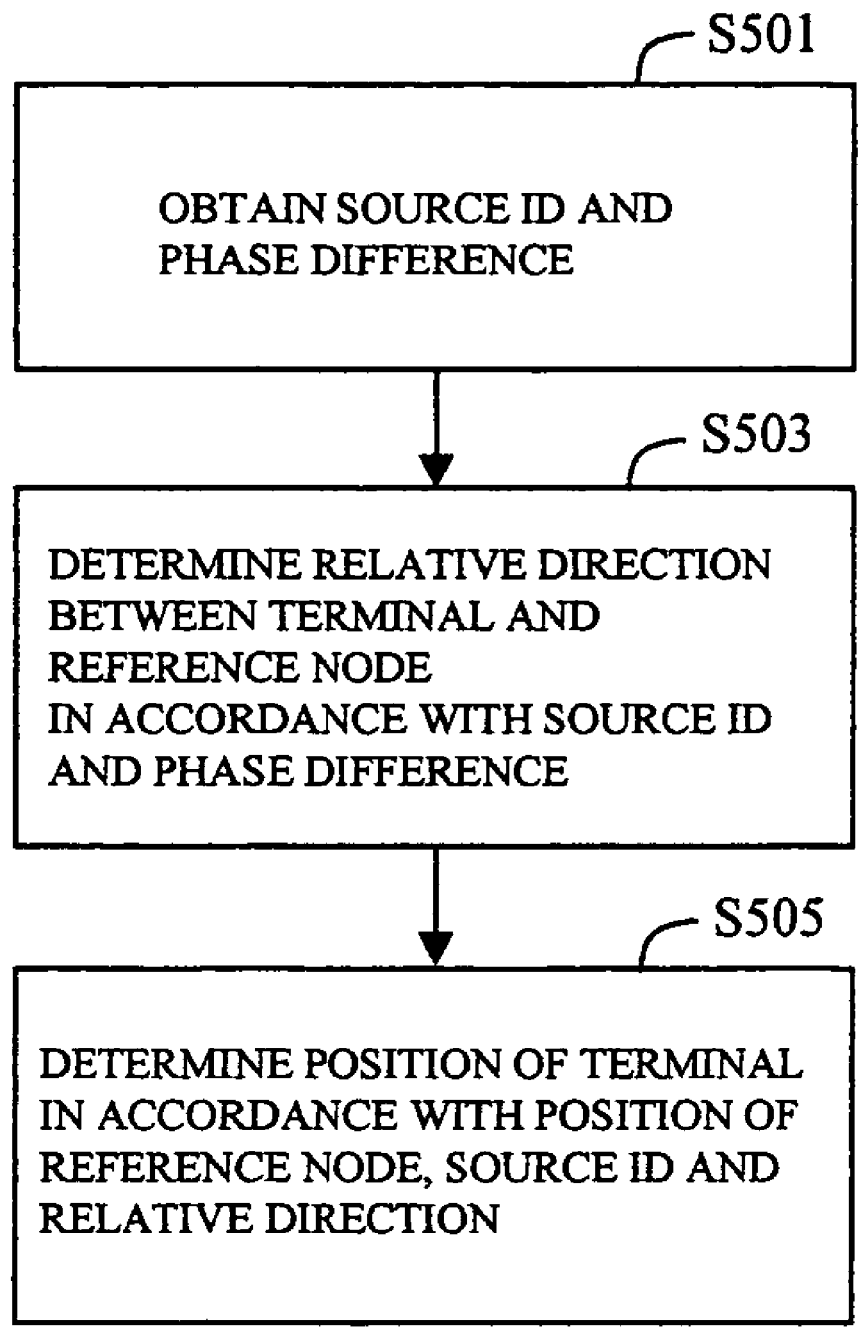
FIG. 5 shows a flow diagram for determining the position of the mobile wireless terminal in accordance with the source ID and the phase difference between received RF signals.

FIG. 5 shows a flow diagram of a process for determining the position of a mobile wireless terminal in accordance with the source ID detected by the ID detector 457 and with the phase difference between received RF signals detected by the phase difference detector 415 of the node 400. The position is determined by the processor 122, 112, 470 or 370 of the position determining apparatus 120, the server 110, the node 400 or the node 300, in accordance with a program stored in the corresponding storage device 124, 114, 472 or 372.

At Step 501 of FIG. 5, the processor 122, 112, 470 or 370 obtains the source ID and the phase difference between received RF signals. At Step 503, the processor derives, from the source ID and the phase difference, a relative angular direction between the mobile wireless terminal and the reference node. At Step 505, the processor determines the position of the mobile wireless terminal in accordance with the known position of the reference node, the source ID, and the relative angular direction.

FIGS. 6A to 6D show relationships among received data $DATA_1$, $DATA_2$ and $DATA_3$ demodulated by the modem 455, phase differences (PDs), $\Delta\phi_1$, $\Delta\phi_2$ and $\Delta\phi_3$, detected by the phase difference detector 415, frames of angular direction data for determining the position, and the determined position data (x,y) of a mobile wireless terminal $ID_{T1}$.

Referring also to FIG. 4, the received data $DATA_1$, $DATA_2$ and $DATA_3$ of FIG. 6A which are produced by the modem 455 are provided to the signal processor 470. The received data from each node 300 contains the source ID of the node 300. The received data $DATA_1$, $DATA_2$ and $DATA_3$ contain respective source IDs, $ID_1$, $ID_2$ and $ID_3$, of the reference wireless stations 200, 220, 230 and 240 of FIG. 1, or the mobile wireless terminals 262 and 282 and the like of FIG. 2. The received sets of data, $DATA_1$, $DATA_2$ and $DATA_3$, are provided also to the ID detector 457. The ID detector 457 detects and extracts the source IDs, $ID_1$, $ID_2$ and $ID_3$, in the received data to provide the extracted IDs to the signal processor 470. The phase differences PDs, $\Delta\phi_1$, $\Delta\phi_2$ and $\Delta\phi_3$, of FIG. 6B detected by the phase difference detector 415, as described later, are provided to the signal processor 470.

The signal processor 470 of the communication node 400 determines the angular directions of the mobile wireless terminals 260 and 280 in accordance with the phase differences PDs, combines the determined angular directions with the source IDs to send the determined angular directions combined with the source IDs to another node or apparatus. The calculation of the angular direction in accordance with the phase difference may be performed by the phase difference detector 415, in the manner described later. As shown in FIG. 6D, the position (x, y) of the mobile wireless terminal ($ID_{T1}$) is determined in accordance with the frames of the sets of the source ID and the angular direction shown in FIG. 6C, in the manner described later. The sets of the source ID and the angular direction, ($ID_1$, $\theta_1$), ($ID_2$, $\theta_2$) and ($ID_3$, $\theta_3$ sent to another apparatus, preferably, the position determining apparatus 120 in order to determine the position of the mobile wireless terminal shown in FIG. 6D. The determined position may be sent to the mobile wireless terminal for use in the terminal. Alternatively, in the mobile wireless terminal 260 or 280 of FIG. 1, the position of the terminal may be determined by the own signal processor 470 without sending the angular direction sets to another apparatus.

As described above, the signal processor 470 of the node 400 may send the frames of the source ID and the angular direction shown in FIG. 6C, to the other node, and the position shown in FIG. 6D may be determined by the other node or apparatus. For example, the signal processor 470 may send the frames to the position determining apparatus 120 via the access point 200 or 202 and the LAN 50, and the position determining apparatus 120 may determine the position in accordance with the frames. For example, the signal processor 470 may send the frames to the server 110 via the access point 200 or 202 and the LAN 50, and the server 110 may determine the position in accordance with the received frames. For example, the signal processor 470 may send the frames to the one communication node 300, and the signal processor 370 of the communication node 300 may determine the position in accordance with the received frames. For example, the signal processor 370 or 470 of the access point 200 or 202 may collect the frames from the other nodes and determine the position in accordance with the received frames. When the position determination is performed by an apparatus other than the mobile wireless terminals 240, 260, 242 and 262, the processing load in the terminals can be reduced.

Alternatively, the signal processor 470 of the node 400 may produce frames (not shown) including respective sets of the source ID and the phase difference PD, ($ID_1$, $\theta_1$), ($ID_2$, $\theta_2$) and ($ID_3$, $\theta_3$), and send the frames to another node. The angular direction and the position are determined by the other node or apparatus in accordance with the source ID and the phase difference PD.

The communication between the reference wireless station and the mobile wireless terminal, and hence communication units of the nodes 300 and 400 operate in accordance with, typically, a short distance wireless communication standard such as the Bluetooth standard or a wireless LAN standard. The Bluetooth standard uses the 2.4 GHz band (2.402 GHz-2.480 GHz) called ISM (Industrial, Scientific and Medical) band. It defines three power classes 1 to 3 for 1 mW, 2.5 mW and 100 mW. In Power Classes 1 to 3, short distance communications in a range of about 10 m to about 100 m can be done. The Bluetooth employs the GFSK modulation and the frequency hopping scheme. The wireless LAN standard, such as IEEE 802.11, uses the 2.4 GHz band (2.40 GHz-2.497 GHz) and employs the spread spectrum scheme and the DBPSK or DQPSK modulation, or the frequency hopping scheme and the GFSK modulation, for communications.

Figure 7A:
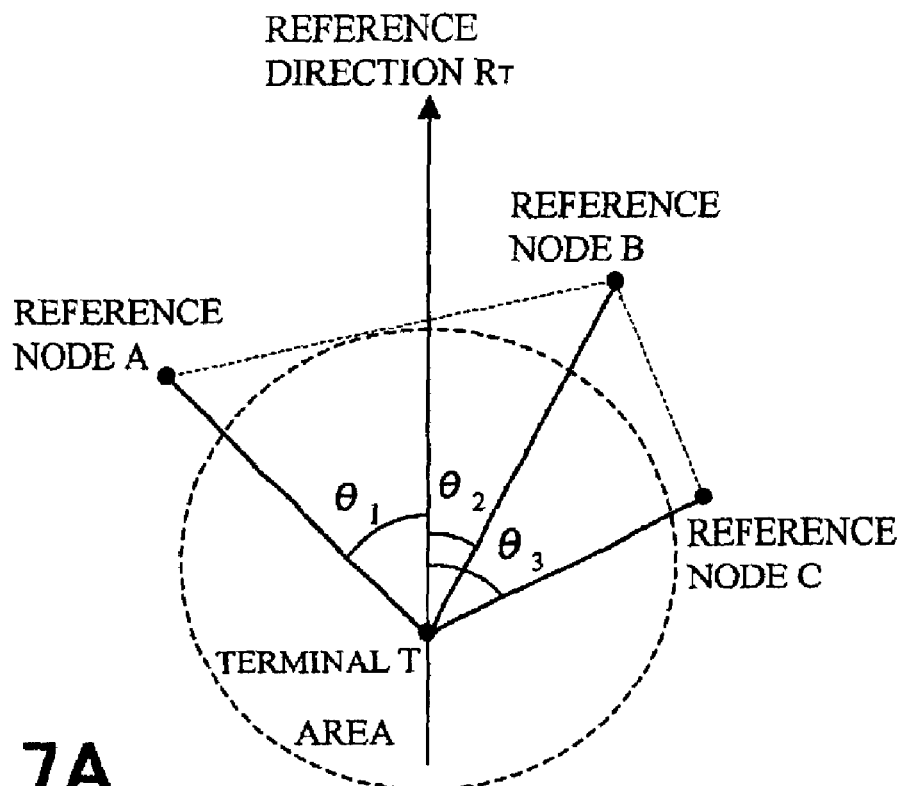
FIG. 7A is useful for explaining a method for determining the position of one mobile wireless terminal in each of the areas in the system of FIG. 1, in accordance with the determined angular directions of the respective three reference nodes relative to the mobile wireless terminal.

FIG. 7A is useful for explaining a method for determining the position (x, y) of one mobile wireless terminal T in each of the areas in the system of FIG. 1, in accordance with the determined angular directions $\theta_1$, $\theta_2$ and $\theta_3$ of the respective three reference nodes or reference wireless stations A, B and C relative to the mobile wireless terminal T. For that purpose, it is assumed that the positions of the three reference nodes A, B and C are known.

In FIG. 7A, it is assumed that the mobile wireless terminal T has a reference angular direction, i.e. reference direction of the angle, or azimuth RT which is determined as described later. The determined angular directions between the reference direction RT in the mobile wireless terminal T and the three reference nodes A, B and C are indicated by θ1, θ2 and θ3, respectively. The three reference communication nodes A, B and C are three ones of the reference wireless stations 200 to 240 of FIG. 1. When the three reference nodes A, B and C are placed so that a straight line connecting the positions of the reference nodes A and B, and a straight line connecting the positions of the reference nodes B and C lie outside the area, the position of the mobile wireless terminal T can be uniquely determined in accordance with the determined angular directions $\theta_1$, $\theta_2$ and $\theta_3$ because the positions of the reference nodes A, B and C are known.

When the reference angular direction RT is adapted by any means to constantly indicate geographically the same azimuth and the two reference nodes A and B are placed so that the straight line connecting the positions of the two reference nodes A and B lies outside the area, the position of the mobile wireless terminal T can be uniquely determined in accordance with the angular directions of the two reference nodes relative to the reference direction RT in the mobile wireless terminal T, for example, the angular directions $\theta_1$ and $\theta_2$ of the nodes A and B.

Figure 7B:
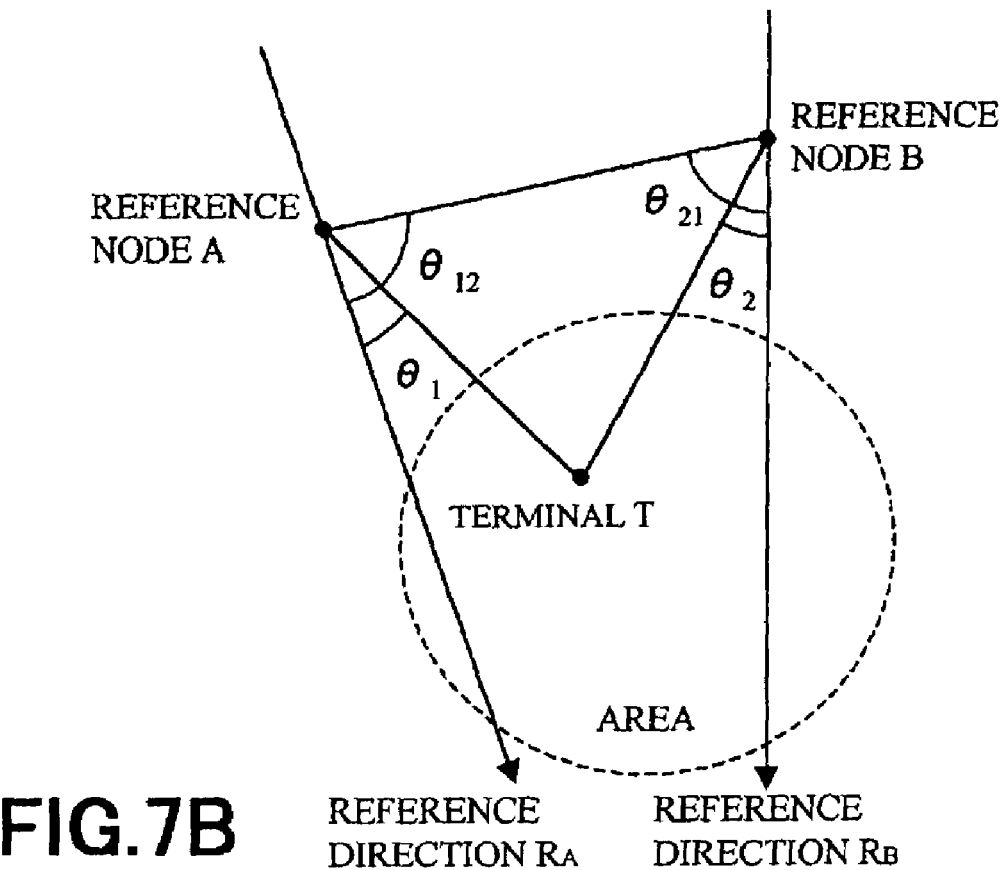
FIG. 7B is useful for explaining a method for determining the position of one mobile wireless terminal in each of the areas in the system of FIG. 2, in accordance with the determined angular directions of the terminal relative to the two reference nodes.

FIG. 7B is useful for explaining a method for determining the position (x, y) of one mobile wireless terminal T in each of the areas in the system of FIG. 2, in accordance with the determined angular directions $\theta_1$ and $\theta_2$ of the mobile wireless terminal T relative to the two reference nodes A and B in the system. The position of the mobile wireless terminal T is determined in accordance with at least two determined angular directions of the mobile wireless terminal T It is assumed that the positions of the two reference nodes A and B are known.

In FIG. 7B, it is assumed that the two reference communication nodes A and B have reference angular directions $R_A$ and $R_B$, respectively. It is assumed that the determined angular directions between the mobile wireless terminal T and the reference directions $R_A$ and $R_B$ in the two reference communication nodes A and B are indicated by $\theta_1$ and $\theta_2$, respectively. The two reference communication nodes A and B are two ones of the reference wireless stations 202 to 242 of FIG. 2.

When the reference angular directions $R_A$ and $R_B$ of the two reference communication nodes A and B are determined independently of each other, an angular direction $\theta_{12}$ between the reference direction $R_A$ in the one reference communication node A and the other node B, and an angular direction $\theta_{21}$ between the reference direction $R_B$ in the other reference communication node B and the one node A are determined, and the position of the mobile wireless terminal T can be uniquely determined in accordance with the known positions of the two reference communication nodes A and B, and with the determined angular directions, $\theta_{12}$, $\theta_{21}$, $\theta_1$ and $\theta_2$, i.e. ($\theta_{12}-\theta_1$) and ($\theta_{21}-\theta_2$). In order to determine the angular directions $\theta_{12}$ and $\theta_{21}$, each of the reference communication nodes A and B in the form of the node 400 of FIG. 4 receives an RF signal which contains the source ID, which is transmitted from the other reference communication node (400) B or A via the antenna 411 or 451 of the one node, and which is similar to the RF signal from the node 300 of FIG. 3.

On the other hand, when the relationship between the reference angular directions or azimuths $R_A$ and $R_B$ in the positions of the two reference communication nodes A and B is known and the reference nodes A and B are placed so that the straight line connecting the positions of the two reference nodes A and B lies outside the area, the position of the mobile wireless terminal T can be uniquely determined in accordance with the known positions of the two reference communication nodes A and B and with the determined angular directions $\theta_1$ and $\theta_2$ relative to the reference directions $R_A$ and $R_B$.

Figure 8:
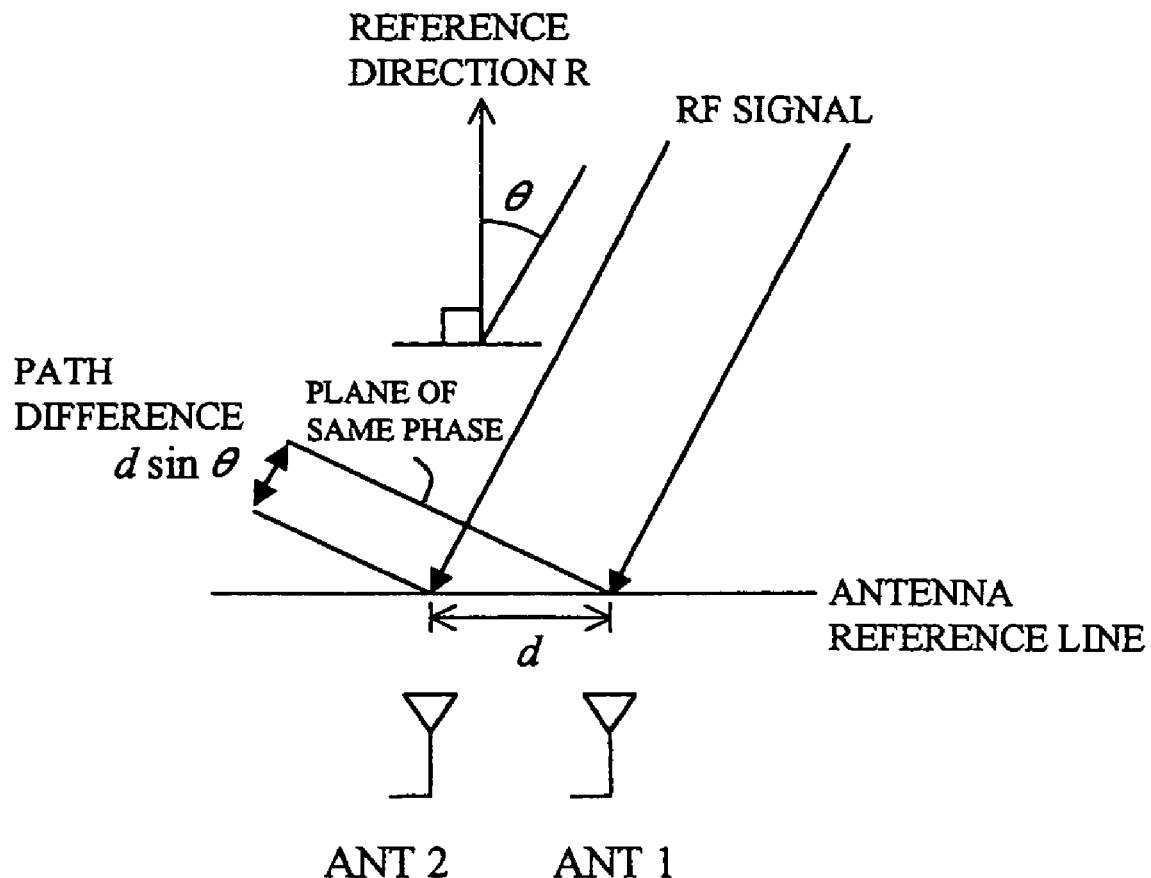
FIG. 8 is useful for explaining a technique of determining the incident angular direction of an RF signal in accordance with the phase difference of RF signals received by the two antennas of the communication node of FIG. 4.

FIG. 8 is useful for explaining a technique of determining the incident angular direction of an RF signal in accordance with the phase difference of RF signals received by the two antennas ANT1 (411) and ANT2 (451) of the communication node 400 of FIG. 4, or of IF signals on the RF signals. An RF signal at, for example, a frequency in the vicinity of 2.5 GHz has a wavelength X of about 12 cm. The antennas ANT1 and ANT2 are on a horizontal line and displaced from each other by a distance d ($<\lambda/2$) of, for example, about 3 cm. A straight line passing the positions of the antennas ANT1 and ANT2 is defined as the antenna reference line. A direction on a horizontal plane perpendicular to the antenna reference line is defined as a reference angular direction R of the communication node 400. It is advantageous to use the reference direction R as the reference directions $R_T$, $R_A$ and $R_B$ in FIGS. 7A and 7B.

Referring to FIG. 8, when an RF signal, which horizontally enters at an angle θ relative to the reference direction R, is received by the antennas ANT1 and ANT2, the path difference is d·sin θ. The phase difference between the two antennas ANT1 and ANT2 is $\Delta\phi=2\pi(d\cdot\sin\theta)/\lambda$. Therefore, the incident angular direction of the RF signal relative to the reference direction R is $\theta=\sin^{-1}((\lambda/2\pi d)\Delta\phi)$.

When the reference angular direction $R_T$ of the mobile wireless terminal T, as described in connection with FIG. 7A, is adapted to constantly indicate geographically the same azimuth, for example, the direction of the N-pole, the determined values of the angular directions can be corrected by the difference of the reference angular direction R of FIG. 8 relative to the reference angular direction $R_T$ which is determined by using a gyroscope, a compass or the like that can be provided in the mobile wireless terminal T.

Figure 9:
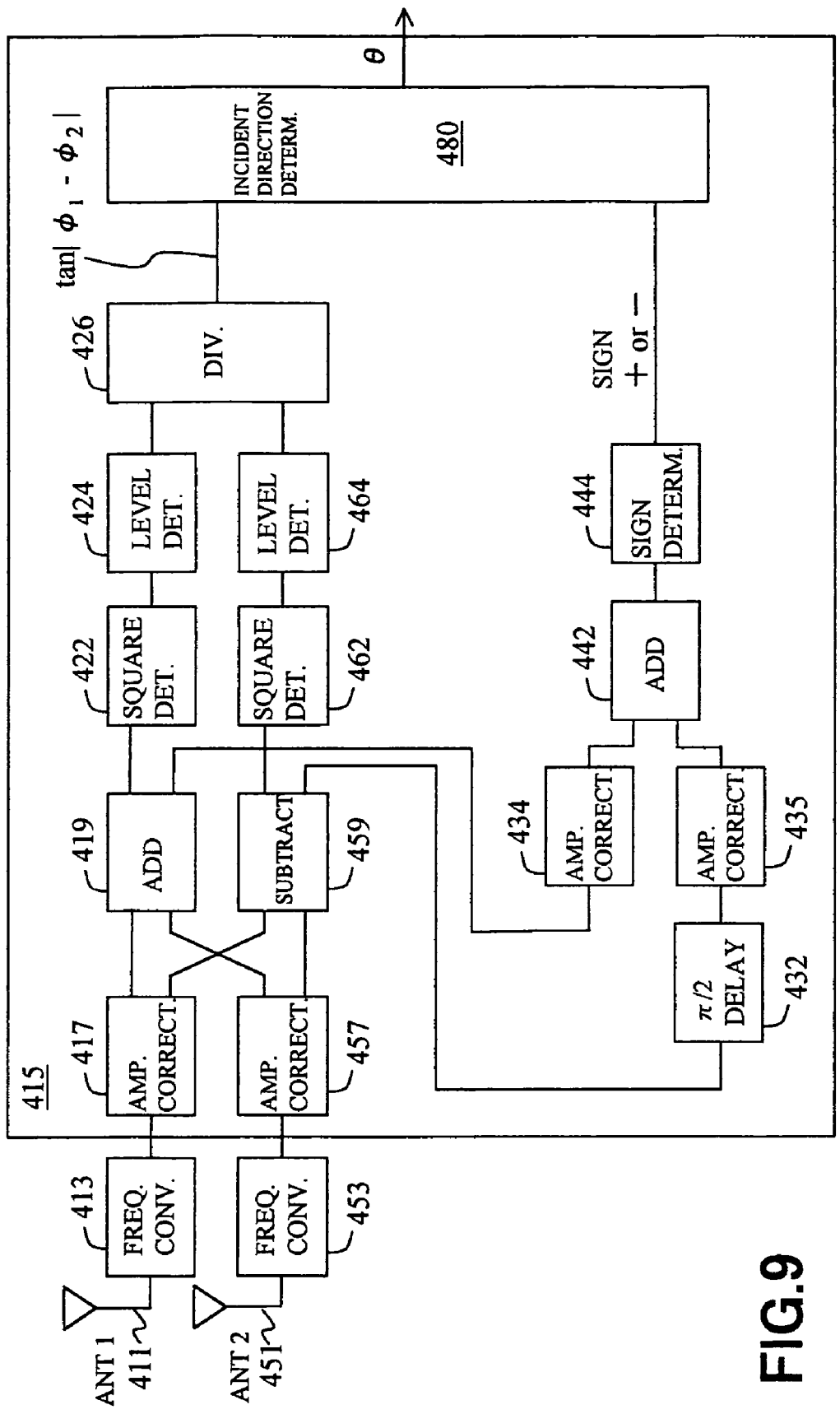
FIG. 9 shows a block diagram of a process for determining the angular direction of the mobile wireless terminal in accordance with the received RF signal.

FIG. 9 shows a block diagram of a process for determining the angular direction θ of the mobile wireless terminal in accordance with the received RF signal. FIG. 9 can be seen as a flowchart of the process for determining the direction. An RF signal, which is received by the antenna ANT1 411, is downconverted by the frequency converter 413 to produce an IF signal $A_1 \cos((\omega+\phi_1))$, where $A_1$ indicates the amplitude, ω indicates the angular velocity, and $\phi_1$ indicates the initial angular phase. An RF signal, which is received by the antenna ANT2 451, is downconverted by the frequency converter 453 to produce an IF signal $A_2 \cos(\omega t+\phi_2)$, where $A_2$ indicates the amplitude, $\omega$ indicates the angular velocity, and $\phi_2$ indicates the initial angular phase. The IF signals have a frequency of, for example, 50 MHz. Alternatively, as described above, the signals $A_1 \cos(\omega t+\phi_1)$ and $A_2 \cos(\omega t+\phi_2)$ may be RF signals which have not yet been downcoverted. The signals $A_1 \cos(\omega t+\phi_1)$ and $A_2\cos((\omega t+\phi_2)$ are provided to the phase difference detector 415.

In the phase difference detector 415, the signals $A_1 \cos(\omega t+\phi_1)$ and $A_2 \cos(\omega t+\phi_2)$ are corrected in amplitude by amplitude correctors 417 and 457, each of which is configured by a limiting amplifier, to be normalized, to thereby produce normalized signals $\cos(\omega t+\phi_1)$ and $\cos(\omega t+\phi_2)$ Both of the normalized signals $\cos(\omega t+\phi_1)$ and $\cos(\omega t+\phi_2)$ are provided to an adder 419 and to a subtracter 459. The adder 419 produces a sum of the signals, $\cos(\omega t+\phi_1)+\cos(\omega t+\phi_2)=\cos((\omega_1-\phi_2)/2)\cdot\cos(\omega t+(\phi_1+\phi_2)/2)$. The subtracter 459 produces a signal representing the difference between the signals, $\cos(\omega t+\phi_1)-\cos(\omega t+\phi_2)=-\sin((+\phi_2)/2)\cdot\sin(\omega t+(\phi_1+\phi_2)/2)$.

The sum and difference signals are squared by square-law detectors 422 and 462, respectively, and the level or magnitude of a square of the sum, $\cos^2((\phi_1-\phi_2)/2)$, and that of a square of the difference, $\sin^2((\phi_1-\phi_2)/2)$, are determined in respective level detectors 424 and 464. The levels are provided to a divider 426. In the divider 426, $\sin^2((\phi_1-\phi_2)/2)/\cos^2((\phi_1-\phi_2)/2)\tan^2((\phi_1-\phi_2)-/2)$ is determined in accordance with the levels to produce a square root of the value, $|\tan((\phi_1-\phi_2)/2)|=\tan(|\phi_1-\phi_2|/2)$, and produce the absolute value of the phase difference $|\Delta\phi|=|\phi_1-\phi_2|$. The absolute value of the phase difference $|\Delta\phi|$ is provided to an incident direction determining device 480. Preferably, each of the level detectors 424 and 464 includes an A/D converter and provides a digital signal as an output.

On the other hand, the sum signal is provided also to an amplitude corrector 434 configured by a limiting amplifier, to be corrected in amplitude and normalized, to thereby produce a signal $\cos((\omega t+(\phi_1+\phi_2)/2))$. The difference signal is delayed by $\pi/2$ in a delay element 432 to produce a signal $\sin((\phi_1-\phi_2)/2)\cos(\omega t+(\phi_1+\phi_2)/2)$. The delayed signal is provided to an amplitude corrector 435 configured by a limiting amplifier, to be corrected in amplitude and normalized, to thereby produce a signal $\text{sgn}(+1-\phi_2)\cdot\cos(\omega t+(\phi_1+\phi_2)/2)$, where $\text{sgn}(x)=+1$ for $x<0$, and $\text{sgn}(x)=1$ for $x>0$.

The signal $\cos(\omega t+(\phi_1+\phi_2)/2)$ from the amplitude corrector 434 is added to the signal $\text{sgn}(\phi_1-\phi_2)\cos(\omega t+(\phi_1+\phi_2)/2)$ from the amplitude corrector 435 in an adder 442. The adder 442 produces a value of two (2) for the phase difference $\phi_1-\phi_2>0$ (zero), i.e. positive, and the adder produces a value of zero (0) for the phase difference $\phi_1-\phi_2<0$ (zero), i.e. negative. The output of the adder 442 is thresholded by a sign determining device 444 to determine the value as either positive (+) or negative (−). The positive/negative sign is provided as the sign of the phase difference $(\phi_1-\phi_2)$ to the incident direction determining device 480.

In the manner described in connection with FIG. 8, the incident direction determining device 480 determines the incident angular direction $\theta$ of the RF signal in accordance with the absolute phase difference $|\Delta\phi|=|\phi_1-\phi_2|$, the sign (+ or −) of the phase difference, and the distance d between the antennas. Alternatively, the function for determining the incident angular direction in the incident direction determining device 480, or for determining the incident angular direction in the divider 426 and the incident direction determining device 480 may be performed by the signal processor 470 of the node 400, another node, another apparatus or the like rather than the phase difference detector 415. When the function is performed in another node or apparatus, the level signals which are provided from the level detectors 424 and 464 in FIG. 9 to the divider 426, and the sign signal which is provided from the sign judgement device 444 to the incident direction determining device 480 may be sent in combination with the source ID to the other node or apparatus, and, for example, to the position determining apparatus 120 via the access point 200 or 202 and the LAN 50.

Figure 10:
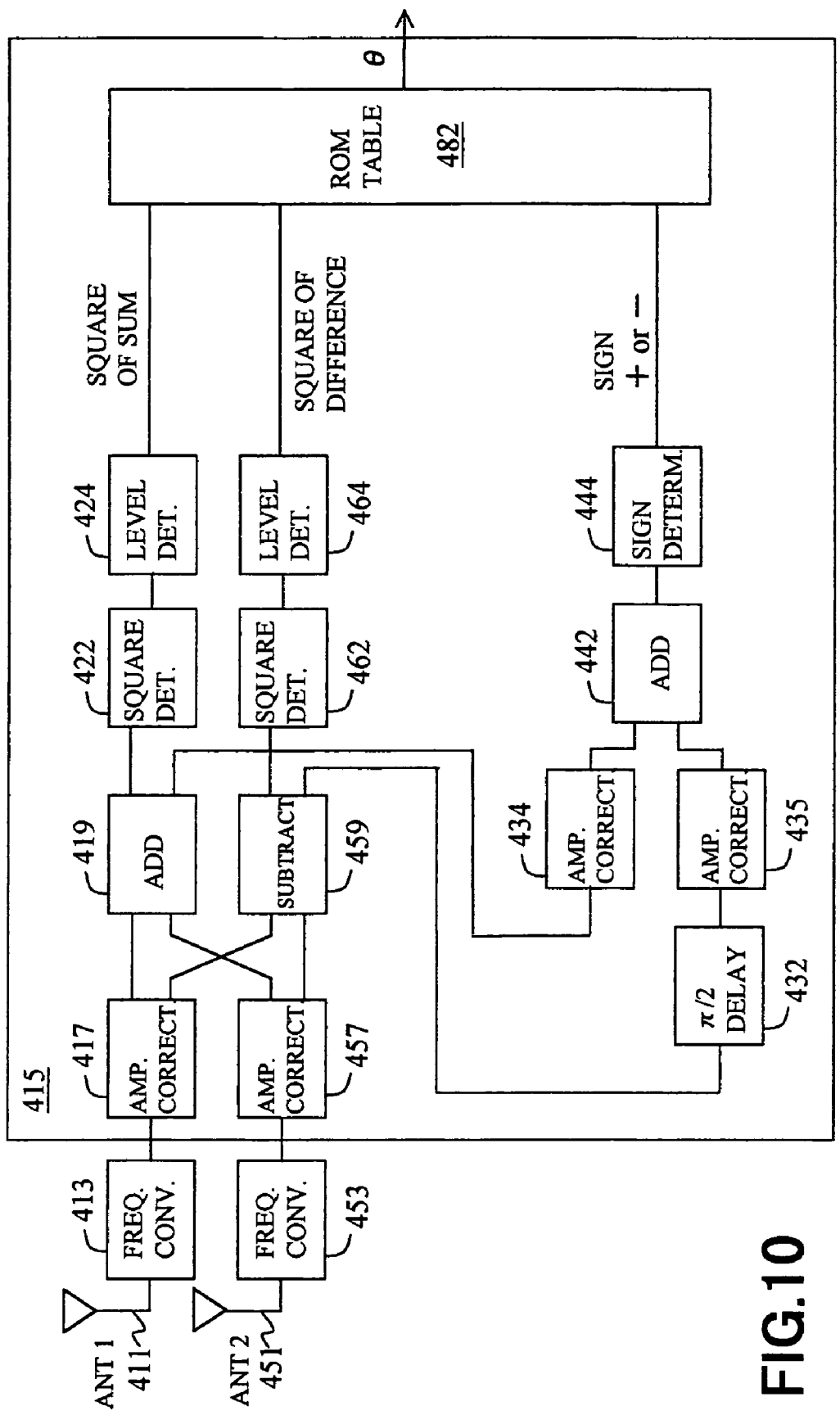
FIG. 10 shows a block diagram of another process for determining the angular direction of the mobile wireless terminal in accordance with the received RF signal.

FIG. 10 shows a block diagram of another process for determining the angular direction $\theta$ of the mobile wireless terminal in accordance with the received RF signal, which is a modification of the process of the block diagram of FIG. 9. FIG. 10 also can be seen as a flowchart of the process for determining the direction. In the process of FIG. 10, in place of the divider 426 and the incident direction determining device 480 of FIG. 9, a ROM table 482 for determining the incident direction, or a processor 482 including such a ROM table is provided. The ROM table 482 uses, as indices, both of the levels of a square of the sum, $\cos^2(\phi_1-\phi_2)/2)$, and a square of the difference, $\sin^2((\phi_1-\phi_2, )/2)$, from the respective level detectors 424 and 464, and the sign from the sign determining device 444, to provide, as an output, the value of the corresponding incident angle $\theta$ of the RF signal. In the ROM table 482, a table is provided which correlates the indices with the value of the incident direction $\theta$ in accordance with the equations which have been described in connection with FIG. 8.

Figure 11:
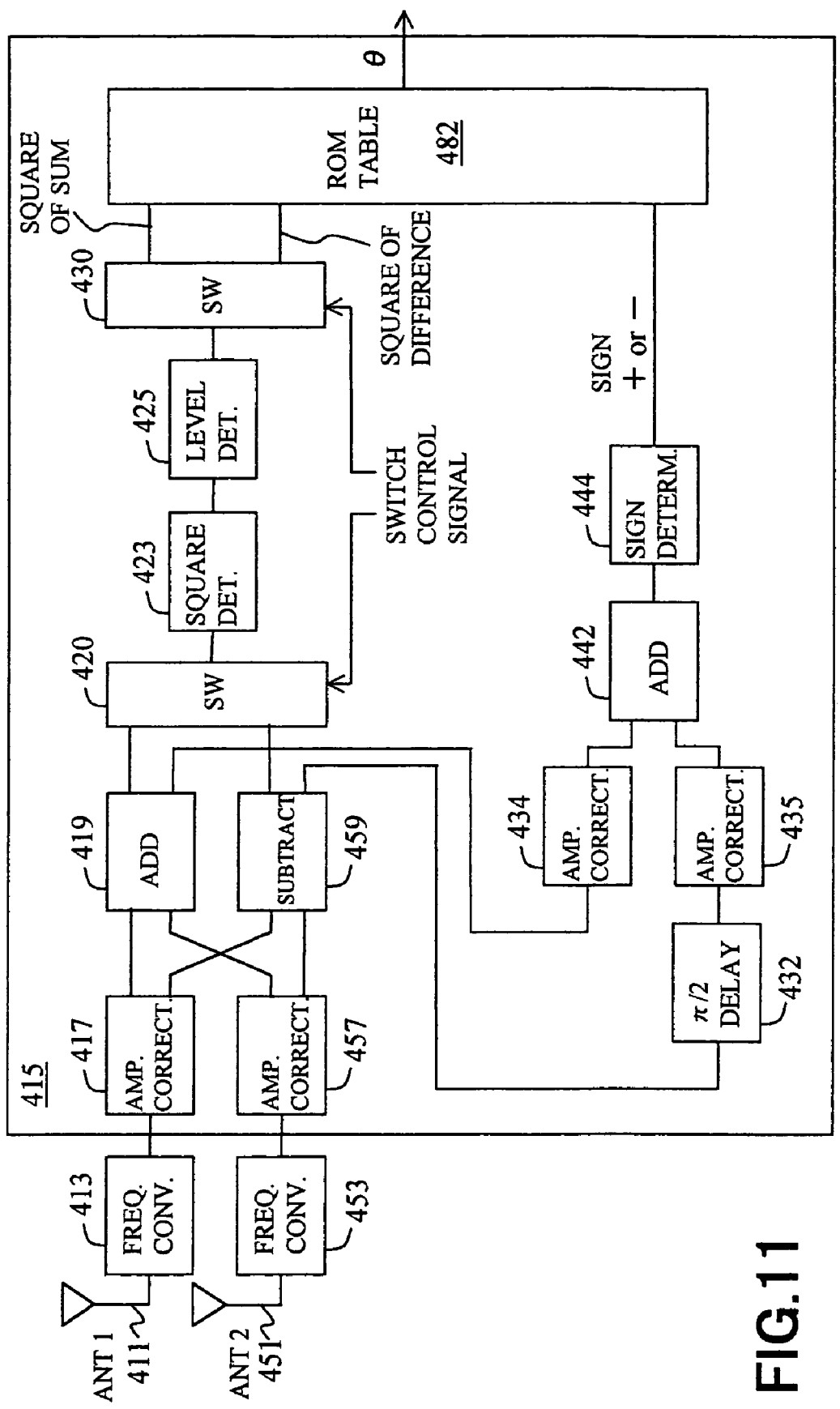
FIG. 11 shows a block diagram of a further process for determining the angular direction of a mobile wireless terminal in accordance with the received RF signal.

FIG. 11 shows a block diagram of a further process for determining the angular direction $\theta$ of a mobile wireless terminal in accordance with the received RF signal, which is a modification of the process of the block diagram of FIG. 10. FIG. 11 also can be seen as a flowchart of the process for determining the direction. In the process of FIG. 11, in place of the square-law detectors 422 and 462 and the level detectors 424 and 464 of FIG. 10, a square-law detector 423 and a level detector 425 are connected between switches 420 and 430. The switch 420 is switched in synchronization by a switching control signal to alternately provide the sum $\cos((\phi_1-\phi_2/2)\cos(\omega t+(\phi_1-\phi_2)/2)$ from the adder 419 and the difference $-\sin((\phi_1-\phi_2)/2)\sin(\omega t+(\phi_1-\phi_2)/2)$ from the subtracter 459 to the square-law detector 423 and the level detector 425. The switch 430 alternately provides the level of a square of the sum, $\cos^2((\phi_1-\phi_2)/2)$, and the level of a square of the difference, $\sin^2((\phi_1-\phi_2)/2)$ to the ROM table 482. In the same manner as the table described above, the ROM table 482 provides, as an output, the value of the corresponding incident angular direction $\theta$ of the RF signal.

In FIGS. 10 and 11, alternatively, the ROM table 482 may be provided in the signal processor 470 of the node 400, another node, another apparatus or the like rather than the phase difference detector 415, to determine the incident angular direction. When the incident angular direction is determined in another node or apparatus, the level signals provided from the level detectors 424 and 464 or from the level detector 425 via the switch 430 to the ROM table 482, and the sign signal provided from the sign determining device 444 to the ROM table 482 may be sent in combination with the source ID to the other node or apparatus, and, for example, to the position determining apparatus 120 via the access point 200 or 202 and the LAN 50.

Figure 12:
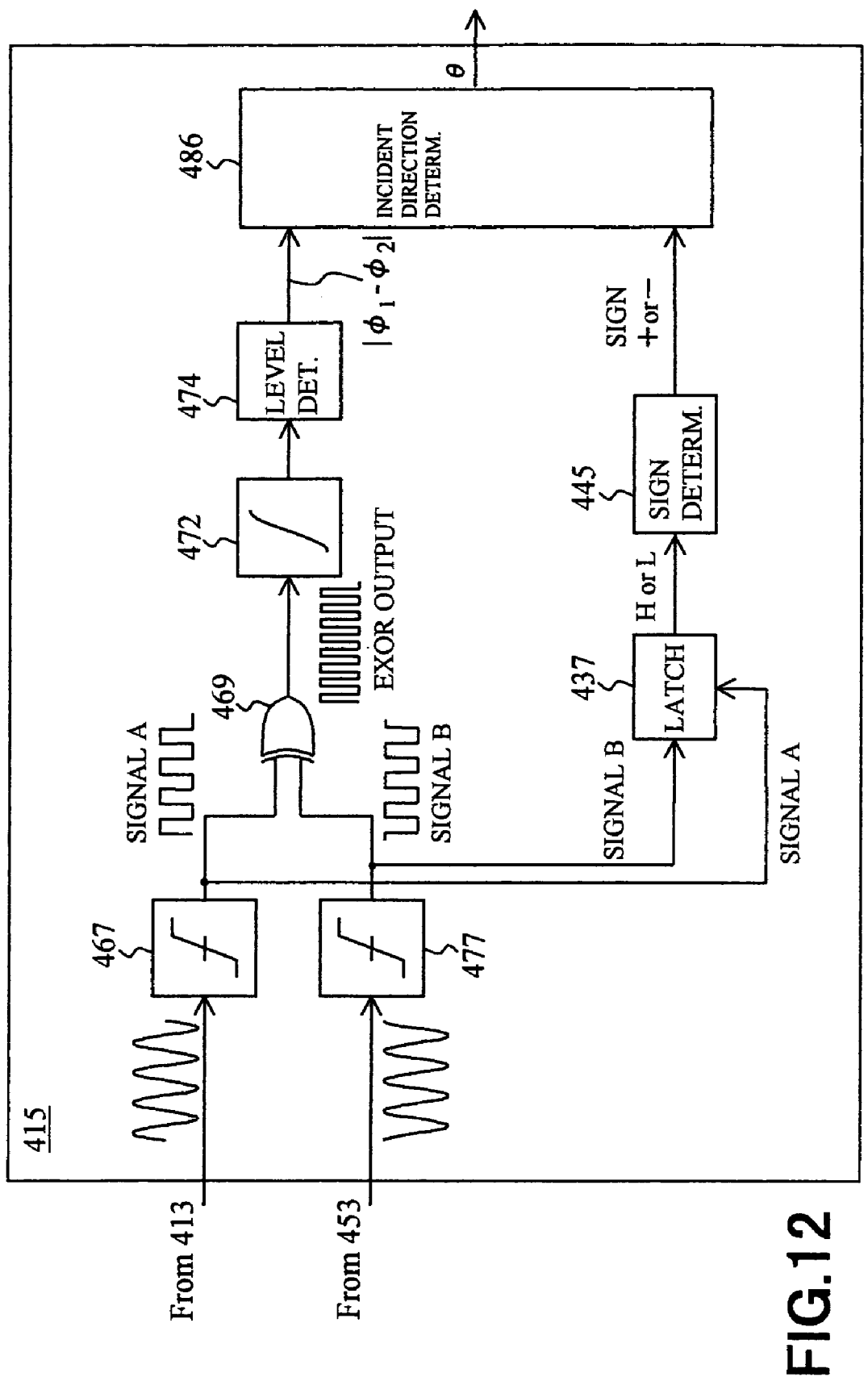
FIG. 12 shows a block diagram of a logic process for determining the direction of a mobile wireless terminal in accordance with the received RF signal.

FIG. 12 shows a block diagram of a logic process for determining the direction of a mobile wireless terminal in accordance with the received RF signal, as an alternative to the processes of FIGS. 9 to 11. FIG. 12 also can be seen as a flowchart of the process for determining the direction.

Figure 13A:
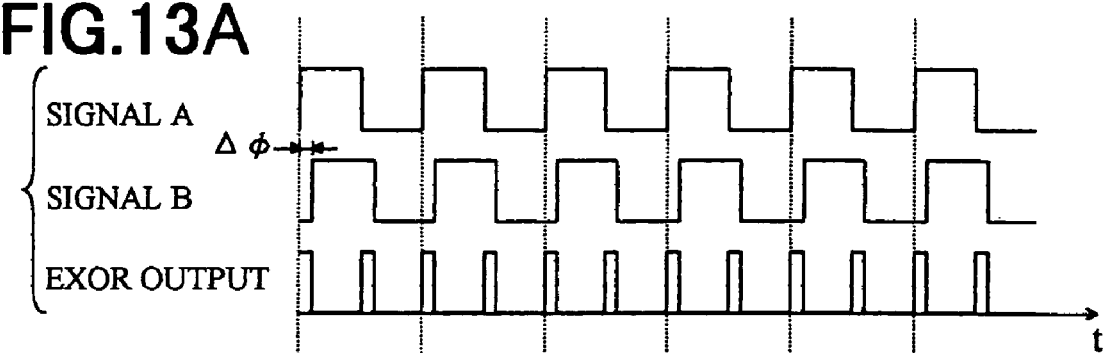
FIGS. 13A to 13C show logic levels of different signals of FIG. 12 for determining the absolute phase difference.
Figure 13B:
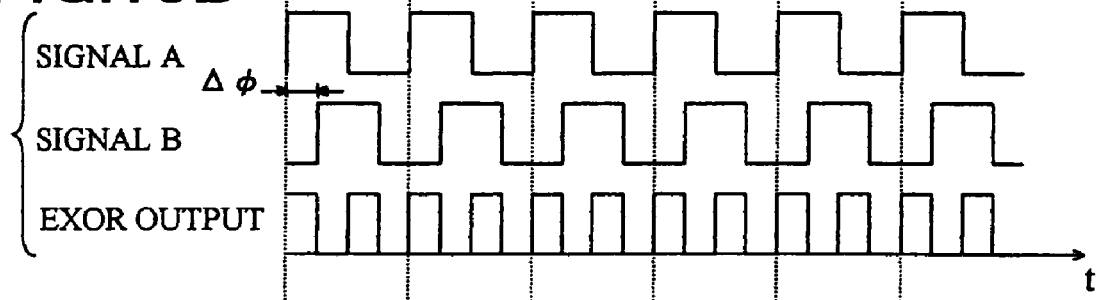
Figure 13C:
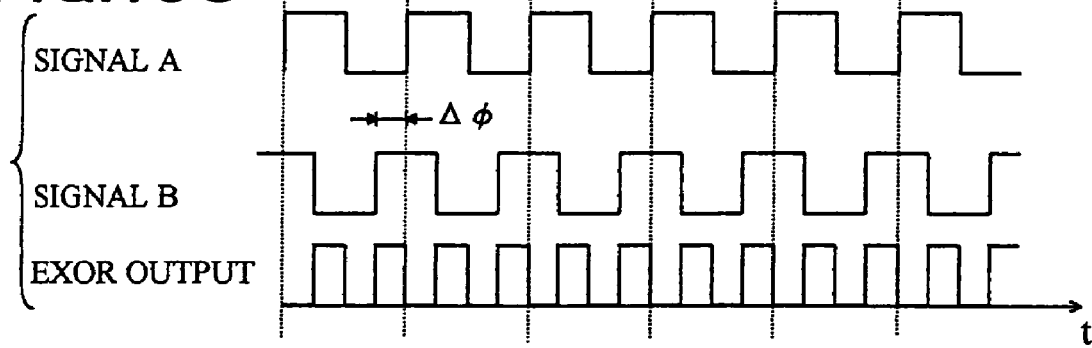
Figure 14A:
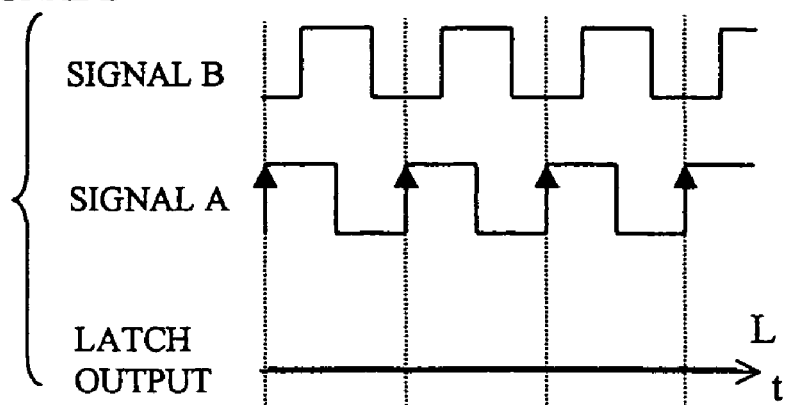
FIGS. 14A and 14B show logic levels of different signals of FIG. 12 for determining the sign of the phase difference.
Figure 14B:
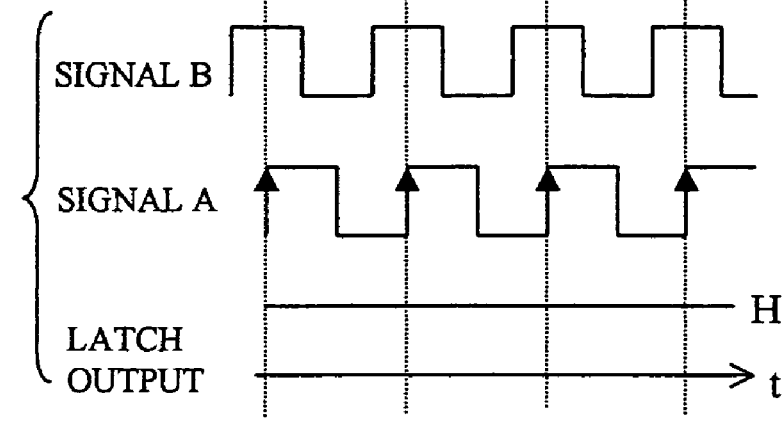

FIGS. 13A to 13C show logic levels of different signals of FIG. 12 for determining the absolute phase difference. FIGS. 14A and 14B show logic levels of different signals of FIG. 12 for determining the sign of the phase difference.

Referring to FIG. 12, the signal from the frequency converter 413 of FIG. 4 is provided to a binarizing element 467, and thresholded in the binarizing element 467 to produce a binary signal A. The signal output from the frequency converter 453 of FIG. 4 is provided to a binarizing element 477, and thresholded in the binarizing element 477 to produce a binary signal B.

The signal A from the binarizing element 467 is provided to one input of an exclusive OR (EXOR) gate 469, and the signal B of the binarizing element 477 is provided to the other input of the exclusive OR (EXOR) gate 469. The EXOR gate 469 EXORs the signal A with the signal B to provide an EXOR output. FIGS. 13A and 13B show relationships among signals when the signal A is advanced in phase from the signal B. FIG. 13C shows relationships among signals when the signal A is delayed in phase from the signal B. As shown in FIGS. 13A to 13C, as the absolute phase difference |Δφ| between the signals A and B becomes larger, the pulse width of the EXOR output becomes larger. The pulse width of the EXOR output indicates the absolute phase difference.

The output from the EXOR gate 469 is provided to a low-pass filter (LPF) 472, and filtered by the LPF 472 to convert the phase difference into an analog level. The analog level of the analog signal output from the LPF 472 is detected as a digital value by a level detector 474 to produce the absolute phase difference $|\Delta\phi|=|\phi_1-\phi_2|$. The absolute phase difference |Δφ| is provided to an incident direction determining device 486.

Referring to FIG. 12, the signal B from the binarizing element 477 is provided also to a latch element 437. In the latch element 437, the signal B is latched at a rising edge of the signal A of the binarizing element 467.

As shown in FIG. 14A, when the signal A is advanced in phase from the signal B, an output of the latch element 437 is always at the Low (L) level. As shown in FIG. 14B, when the signal A is delayed in phase from the signal B, the output from the latch element 437 is always at the High (H) level. The signal, indicating the H or L level, from the latch element 437 is provided to a sign determining device 445. When the signal is at the H level, the sign determining device 445 provides the sign of positive (+) to the incident direction determining device 486, and, when the signal is at the L level, the sign determining device provides the sign of negative (−) to the incident direction determining device 486.

In the manner described in connection with FIG. 8, the incident direction determining device 486 determines the incident angular direction θ of the RF signal in accordance with the absolute phase difference $|\Delta\phi|=|\phi_1-\phi_2|$, the sign (+ or −) of the phase difference, and the distance d between the antennas. The incident direction determining device 486 may include a ROM table, which is similar to that shown in FIG. 10, and in which the absolute phase difference and the sign are used as indices.

Alternatively, the function for determining the incident angular direction in the incident direction determining device 486 may be performed by the signal processor 470 of the node 400, another node, another apparatus or the like rather than the phase difference detector 415. When the function is performed in another node or apparatus, the level signal provided from the level detector 474 in FIG. 12 to the incident direction determining device 486, and the sign signal provided from the sign judgement device 445 to the incident direction determining device 486 may be sent in combination with the source ID to the other node or apparatus, and, for example, the position determining apparatus 120 via the access point 200 or 202 and the LAN 50.

Figure 15A:
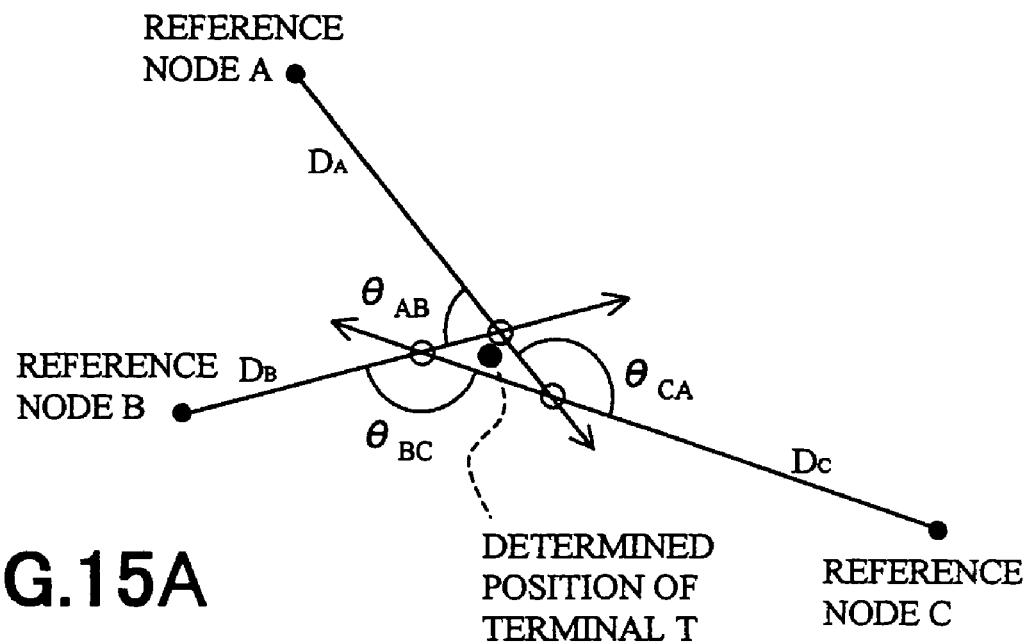
FIGS. 15A and 15B are useful for explaining different methods for determining the position of the terminal by using a plurality of reference communication nodes.
Figure 15B:
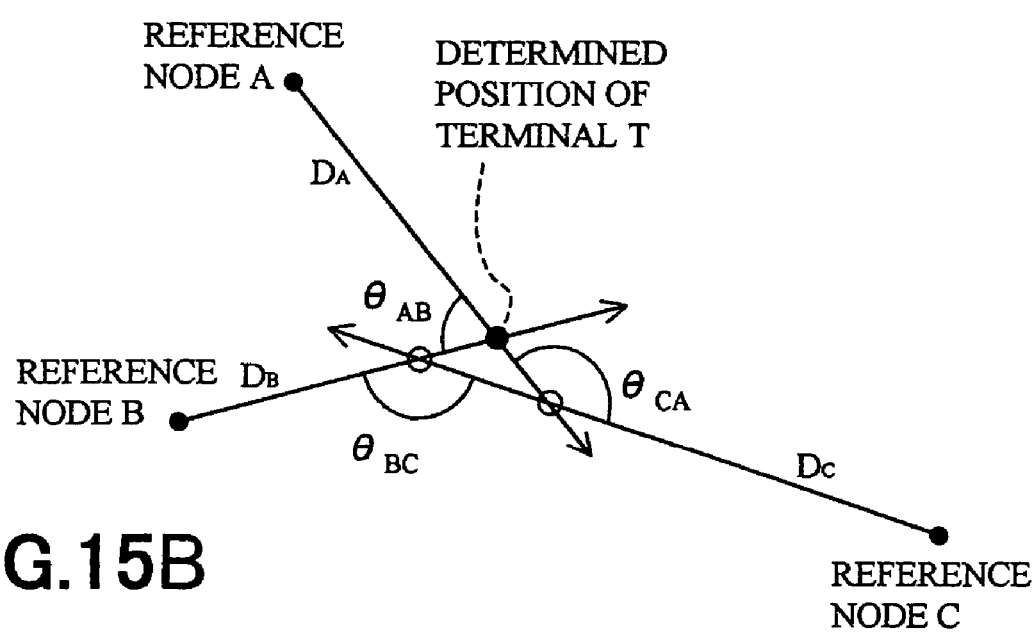

FIGS. 15A and 15B are useful for explaining different methods for determining the position of a terminal by using a plurality of reference communication nodes. In FIGS. 15A and 15B, it is assumed that a determined angle between an angular direction $D_A$ of the terminal T relative to the reference node A and an angular direction $D_B$ of the terminal T relative to the reference node B is $\theta_{AB}$, a determined angle between the angular direction $D_B$ of the terminal T relative to the reference node B and an angular direction $D_C$ of the terminal T relative to the reference node C is $\theta_{BC}$, and an determined angle between the angular direction $D_C$ of the terminal T relative to the reference node C and the angular direction $D_A$ of the terminal T relative to the reference node A is $\theta_{CA}$.

The position determining apparatus 120 of FIGS. 1 and 2, the server 110 of FIGS. 1 and 2, the signal processor 470 of the node 400 of FIG. 4, or the signal processor 370 of the node 300 of FIG. 3 obtains the sets of the source ID and the angular direction, $(ID_1,\theta_1)$, $(ID_2,\theta_2)$ and $(ID_3,\theta_3)$, to determine the position (x,y) of the terminal T as described above.

From FIG. 7A, it is seen that, when the system of FIG. 1 determines the position of a mobile wireless terminal by using more than three reference wireless stations, different terminal positions may be obtained for different combinations of the reference wireless stations due to measurement errors of angular directions. From FIG. 7B, it will be seen that, when the system of FIG. 2 determines the position of a mobile wireless terminal by using more than two reference wireless stations, different terminal positions may be obtained for different combinations of the reference wireless stations due to a measurement error of angular directions.

Referring to FIG. 15A, when a provisional position of the terminal T which is determined in accordance with the angular direction $D_A$ of the terminal T relative to the reference node A and the angular direction $D_B$ of the terminal T relative to the reference node B, with a provisional position of the terminal T determined in accordance with the angular direction $D_B$ Of the terminal T relative to the reference node B and the angular direction $D_C$ of the terminal T relative to the reference node C, and with a provisional position of the terminal T determined in accordance with the angular direction $D_C$ of the terminal T relative to the reference node C and the angular direction $D_A$ of the terminal T relative to the reference node A do not coincide with each other, the position determining apparatus 120, the server 110, or the signal processor 470 or 370 determines the average of the determined provisional positions in an orthogonal coordinate system (x,y) as an appropriate position of the terminal T. Alternatively, the center of gravity of a polygon in which the vertexes lie respectively on the provisional positions may be determined as an appropriate position of the terminal T.

Referring to FIG. 15B, when a provisional position of the terminal T determined in accordance with the angular direction $D_A$ and the angular direction $D_B$, a provisional position of the terminal T determined in accordance with the angular direction $D_B$ and the angular direction $D_C$, and a provisional position of the terminal T determined in accordance with the angular direction $D_C$ and the angular direction $D_A$ do not coincide with each other, a provisional position which has an angle closest to a right angle (90) among the determined angles $\theta_{AB},\theta_{BC}$ and $\theta_{CA}$ is determined or selected as an appropriate position of the terminal T. Alternatively, several angles which are closest to a right angle are extracted from the angles $\theta_{AB}$, $\theta_{BC}$ and $\theta_{CA}$, and the average of the provisional positions having the extracted angles may be determined as an appropriate position of the terminal T. Alternatively, angles which are in a range of 45 to 135 degrees are extracted from the angles, and the average of the provisional positions with the extracted angles may be determined as an appropriate position of the terminal T.

Figure 16:
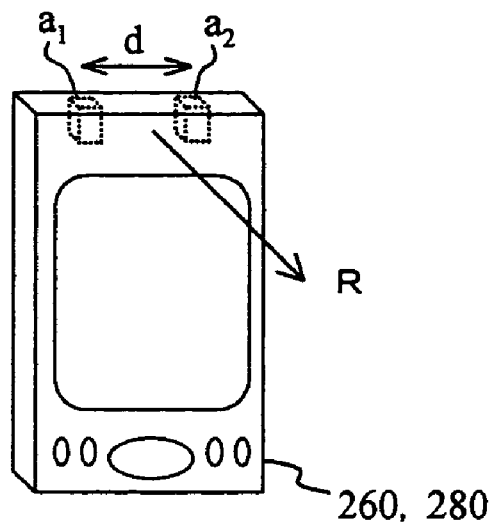
FIG. 16 shows an example of the arrangement of two antennas in the mobile wireless terminal in FIG. 1.

FIG. 16 shows an example of the arrangement of two antennas $a_1$ and $a_2$ in each of the mobile wireless terminals 260 and 280 in FIG. 1. Referring to FIG. 16, the antennas $a_1$ and $a_2$ are placed on or near the upper surface of the mobile wireless terminal 260 or 280 and displaced from each other by a distance d. Preferably, each of the antennas $a_1$ and $a_2$ is a chip or planar antenna having one side edge of about 1 cm or less. The intensity pattern of the received and transmitted RF signals for the antennas $a_1$ and $a_2$ is substantially uniform in all of the horizontal directions, and the antennas $a_1$ and $a_2$ can receive an RF signal radiated from an antenna of a reference node in an arbitrary direction. Preferably, the antennas $a_1$ and $a_2$ are placed inside the terminal, and are not required to be exposed to the outside.

Figure 17A:
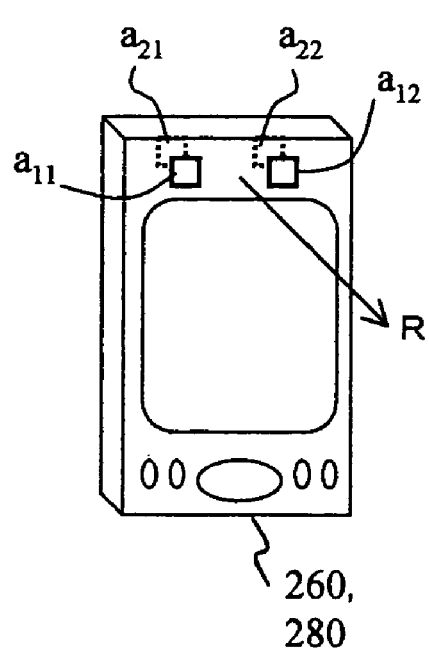
FIGS. 17A and 17B show another example of the arrangement of two antennas in the mobile wireless terminal in FIG. 1, and an intensity pattern of a received RF signal of this example, respectively.
Figure 17B:
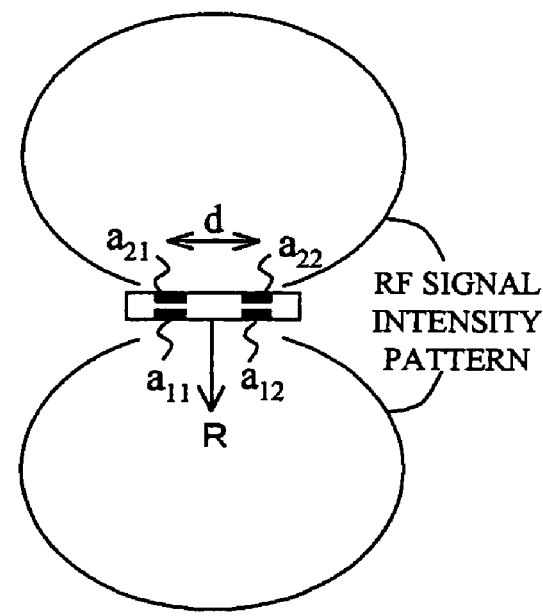

FIGS. 17A and 17B show another example of the arrangement of two antennas in the mobile wireless terminal 260 or 280 in FIG. 1, and an intensity pattern of the received RF signal of this example, respectively. Referring to FIG. 17A, a pair of antennas $a_{11}$ and $a_{12}$ are placed on or near the front surface of the mobile wireless terminal 260 or 280 and displaced from each other by a distance d. Another pair of antennas $a_{21}$ and $a_{22}$ are placed on or near the back surface of the mobile wireless terminal 260 or 280 and displaced from each other by the distance d. Preferably, each of the antennas $a_{11}$, $a_{12}$, $a_{21}$ and $a_{22}$ is a chip or planar antenna having one side edge of about 1 cm or less. The pair of antennas $a_{11}$ and $a_{12}$ exhibit higher directionality in a half of the air space outside the terminal in front of the associated surface, and the received and transmitted RF signal intensity pattern exhibits higher intensity in the half of the air space. The other pair of antennas $a_{21}$ and $a_{22}$ exhibit higher directionality in another half of the air space outside the terminal in back of the opposite associated back surface, and the received and transmitted RF signal intensity pattern exhibits higher intensity in the other half of the air space. Preferably, the antennas $a_{11}$ and $a_{12}$ and the antennas $a_{21}$ and $a_{22}$ are placed inside the terminal, and are not required to be exposed to the outside. Since the two pairs of antennas of high directionality are disposed as described above, the mobile wireless terminal 260 or 280 can receive an RF signal radiated from an antenna of a reference node in an arbitrary direction, and can determine whether the incident direction corresponds to the front side direction or the back side direction of the terminal, without considering the area arrangement.

The reference wireless stations 202, 222 and 242 of FIG. 2 may have the same antenna arrangement as shown in FIG. 16 or 17. The reference wireless stations 202, 222 and 242 may have a pair of antennas of high directionality which are directed to the positioning areas 62 and 64, to thereby reduce the influence of multi-paths. When the size of the apparatus can be made larger, the reference wireless stations 202, 222 and 242 may have two parallel rod antennas.

In the above description, it is assumed that the mobile wireless terminals 260 to 282 and the reference wireless stations 200 to 242 are substantially on the same horizontal plane, and the vertical height difference between the antennas, and the inclinations of the antenna reference lines of the terminals relative to the horizontal plane are negligible or in the range of a tolerable error. The distances between the reference wireless stations 200 to 242 are, for example, about 5 to 10 m. The antennas of the reference wireless stations 200 to 242 have a height in the range of, for example, about 1.5 to 2 m. The antennas of the mobile wireless terminals 260 to 282 have a height in the range of, for example, about 1 to 1.5 m. In this case, the accuracy or resolution of the positioning of the terminal is expected to be within about 1 m.

However, when the height difference between the antennas, and the inclinations of the antenna reference lines are negligible, the direction and the position are three-dimensionally corrected in accordance with the known heights of the antennas of the reference wireless stations 200 to 242 and the known geography or contour of the areas, to thereby determine the position of each of the mobile wireless terminals 260 to 282.

Figure 18:
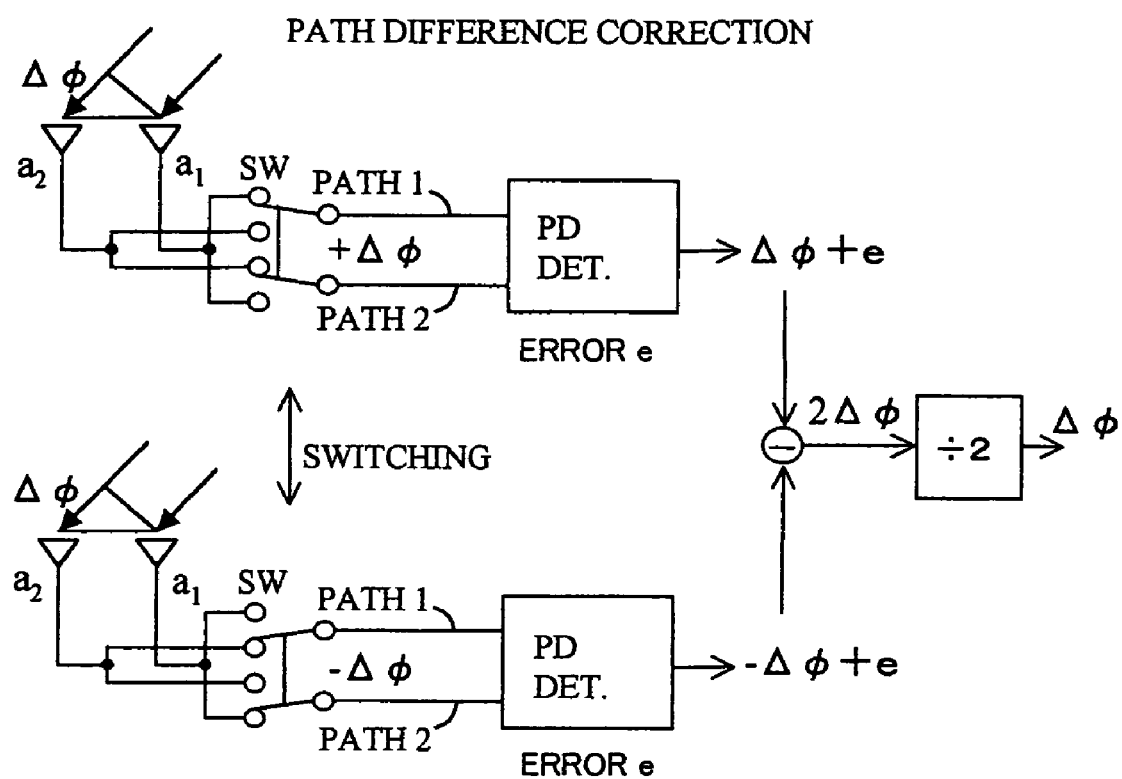
FIG. 18 shows an arrangement which includes a switch for correcting an error due to such a path difference.

When RF signals received by the two antennas $a_1$ and $a_2$ are processed by the communication node 400 of FIG. 4, the phase difference $\Delta\phi$ may exhibit an error e due to the difference of the circuits of the paths in the communication node 400. FIG. 18 shows an arrangement which includes a switch SW for switching connections between two antennas and two paths for correcting an error due to such a path difference.

First, the switch SW is placed on a first pole to provide an RF signal received via the antenna $a_1$ to a path 1 including the frequency converter 413 in FIG. 4, and provide an RF signal received via the antenna $a_2$ to a path 2 including the frequency converter 453. It is assumed that an output from the phase difference detector 415 exhibits a phase error e. Thus, the detected phase difference is $\Delta\phi+e$. The switch SW is then placed on a second pole to provide an RF signal received via the antenna $a_1$ to the path 2 including the frequency converter 453, and provide an RF signal received via the antenna $a_2$ to the path 1 including the frequency converter 413. The detected phase difference is $\Delta\phi-e$. In order to correct the error e, the subtraction is performed on the two phase differences to cancel the error e to obtain the result $2\Delta\phi$. The result is divided by two (2) to produce a corrected phase difference $\Delta\phi$.

The above-described embodiments are only typical examples, and their modifications and variations are apparent to those skilled in the art. It should be noted that those skilled in the art can make various modifications to the above-described embodiments without departing from the principle of the invention and the accompanying claims.

What is claimed is:

1. An apparatus for determining a position of a mobile wireless station, said apparatus comprising:
   a processing unit to determine the position of said mobile wireless station in accordance with:
   a position of a first reference wireless station,
   a position of a second reference wireless station,
   a first angular direction of the first reference wireless station being determined at said mobile wireless station, the first angular direction being directly measured relative to first arbitrary reference direction, the first arbitrary reference direction defined relative to said mobile wireless station, and
   a second angular direction of the second reference wireless station being determined at said mobile wireless station, the second angular direction being directly measured relative to the first reference direction.

2. An apparatus according to claim 1, said first angular direction being determined in accordance with a first phase difference associated with a first RF signal from said first reference wireless station which is received by said mobile wireless station, said second relative angular direction being determined in accordance with a second phase difference associated with a second RF signal from said second reference wireless station which is received by said mobile wireless station.

3. An apparatus for determining a position of a mobile wireless station, said apparatus comprising:
    a processing unit to determine the position of said mobile wireless station in accordance with:
        a position of a first reference wireless station,
        a position of a second reference wireless station,
        a position of a third reference wireless station,
        a first angular direction of the first reference wireless station being determined at said mobile wireless station, the first angular direction being directly measured relative to an arbitrary reference direction, the arbitrary reference direction defined relative to said mobile wireless station,
        a second angular direction of the second reference wireless station being determined at said mobile wireless station, the second angular direction being directly measured relative to the reference direction, and
        a third angular direction of the third reference wireless station being determined at said mobile wireless station, the third angular direction being directly measured relative to the arbitrary reference direction.

4. An apparatus for determining a position of a mobile wireless station, comprising:
    a processing unit:
        obtaining positions of at least first and second reference wireless stations,
        determining at least two phase differences associated with respective received RF signals from the at least first and second, respective reference wireless stations, and
        determining directly, in accordance with the at least two phase differences, respective angular directions of the at least first and second, respective reference wireless stations at the mobile wireless station relative to an arbitrary reference angular direction, the arbitrary reference direction being defined relative to said mobile wireless station.

5. An apparatus according to claim 4, said RF signals being received from said first and second reference wireless stations.

6. An apparatus according to claim 4, said phase difference being associated with said received RF signal between two antennas.

7. An apparatus according to claim 4, said apparatus being said mobile wireless station.

8. An apparatus according to claim 4, said apparatus receiving said two phase differences.

9. The apparatus according to claim 4, where the angular direction is determined by the second reference wireless station.

10. A computer-readable storage storing a program controlling an information processing apparatus to determine a position of a mobile wireless station in a coordinate system by:
    obtaining positions of first and second reference wireless stations;
    determining a first angular direction of a first reference wireless station at said mobile wireless station, the first angular direction being directly measured relative to a first arbitrary reference direction, the first arbitrary reference direction defined relative to said mobile wireless station; and
    determining a second angular direction of the second reference wireless station at said mobile wireless station, the second angular direction being directly measured relative to the first arbitrary reference direction.

11. A computer-readable storage storing a program controlling an information processing apparatus to determine a position of a mobile wireless station in a coordinate system by:
    obtaining positions of first and second reference wireless stations
    determining a first angular direction of the first reference wireless station at said mobile wireless station, the first angular direction being directly measured relative to a first arbitrary reference direction, the first arbitrary reference direction defined relative to said mobile wireless station; and
    determining a second angular direction of the second reference wireless station at said mobile wireless station, the second angular direction being directly measured relative to the first arbitrary reference direction.

12. A computer-readable storage storing a program controlling an information processing apparatus to determine a position of a mobile wireless station in a coordinate system by:
    obtaining positions of at least first and second reference wireless stations;
    determining at least two phase differences associated with respective received RF signals from the at least first and second, respective reference wireless stations; and
    determining directly, in accordance with the at least two phase differences, respective angular directions of the at least a first and a second, respective reference wireless stations at the mobile wireless station relative to an arbitrary reference angular direction, the arbitrary reference direction being defined relative to said mobile wireless station.

13. The computer-readable storage according to claim 12, where the angular direction is determined by the second reference wireless station.

14. A method for determining a position of a mobile wireless station, said method comprising:
    obtaining positions of first and second reference wireless stations;
    determining a first angular direction of the first reference wireless station at said mobile wireless station, the first angular direction being directly measured relative to a first arbitrary reference direction, the first arbitrary reference direction defined relative to said mobile wireless station; and
    determining a second angular direction of the second reference wireless station at said mobile wireless station, the second angular direction being directly measured relative to the first arbitrary reference direction.

15. A method for determining a position of a mobile wireless station, said method comprising:
    obtaining positions of first, second and third reference wireless stations;
    determining a first angular direction of the first reference wireless station at said mobile wireless station, the first angular direction being directly measured relative to an arbitrary reference direction, the arbitrary reference direction defined relative to said mobile wireless station;

determining a second angular direction of the second reference wireless station at said mobile wireless station, the second angular direction being directly measured relative to the arbitrary reference direction; and determining a third angular direction of the third reference wireless station at said mobile wireless station, the third angular direction being directly measured relative to the arbitrary reference direction.

16. A method for determining a position of a mobile wireless station, said method comprising:

obtaining positions of at least first and second reference wireless stations, determining at least two phase differences associated with respective received RF signals from the at least first and second, respective reference wireless stations; and determining directly, in accordance with the at least two phase differences, respective angular directions of the at least first and a second, respective reference wireless stations at the mobile wireless station relative to an arbitrary reference angular direction, the arbitrary reference direction being defined relative to said mobile wireless station.

17. The method according to claim 16, where the angular direction is determined by the second reference wireless station.

* * * * *

UNITED STATES PATENT AND TRADEMARK OFFICE
CERTIFICATE OF CORRECTION

PATENT NO. : 7,304,610 B2 Page 1 of 1
APPLICATION NO. : 11/582377
DATED : December 4, 2007
INVENTOR(S) : Teruhisa Ninomiya et al.

It is certified that error appears in the above-identified patent and that said Letters Patent is hereby corrected as shown below:

Column 18, Line 16, after "stations" insert --;--.

Signed and Sealed this

Second Day of September, 2008

JON W. DUDAS
*Director of the United States Patent and Trademark Office*